United States Patent
Tsuboi et al.

(10) Patent No.: US 8,351,518 B2
(45) Date of Patent: Jan. 8, 2013

(54) WIRELESS TRANSMITTING APPARATUS, WIRELESS RECEIVING APPARATUS, WIRELESS COMMUNICATION SYSTEM, WIRELESS TRANSMITTING METHOD AND WIRELESS RECEIVING METHOD

(75) Inventors: Hidekazu Tsuboi, Chiba (JP); Yasuhiro Hamaguchi, Ichihara (JP); Yasuyuki Kato, Chiba (JP); Waho Oh, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 793 days.

(21) Appl. No.: 12/088,068

(22) PCT Filed: Sep. 29, 2006

(86) PCT No.: PCT/JP2006/319553
§ 371 (c)(1),
(2), (4) Date: Mar. 25, 2008

(87) PCT Pub. No.: WO2007/037415
PCT Pub. Date: Apr. 5, 2007

(65) Prior Publication Data
US 2009/0232243 A1    Sep. 17, 2009

(30) Foreign Application Priority Data

Sep. 30, 2005 (JP) ................... 2005-289278
Jan. 13, 2006 (JP) ................... 2006-006384

(51) Int. Cl.
*H04B 7/02* (2006.01)
(52) U.S. Cl. ........................ 375/260; 375/267
(58) Field of Classification Search ................. 375/267, 375/260, 316; 370/203, 208, 500, 491
See application file for complete search history.

(56) References Cited

U.S. PATENT DOCUMENTS

| 7,616,698 | B2 | 11/2009 | Sun et al. |
| 2003/0072255 | A1* | 4/2003 | Ma et al. ............... 370/208 |
| 2004/0087282 | A1 | 5/2004 | Ishikawa |

(Continued)

FOREIGN PATENT DOCUMENTS

JP    2003-204317 A    7/2003

(Continued)

OTHER PUBLICATIONS

R1-050796, "Pilot Channel for Evolved UTRA OFDMA Downlink", Sharp Corporation, Aug.-Sep. 2, 2005.*

(Continued)

*Primary Examiner* — Aristocratis Fotakis
(74) *Attorney, Agent, or Firm* — Birch, Stewart, Kolasch & Birch, LLP

(57) ABSTRACT

To enable shared control information to be demodulated without requiring advance information on a MIMO block or non-MIMO block prior to demodulation of the shared control information of the block, and further enable the shared control information to be demodulated early. A wireless transmitting apparatus which performs wireless transmission in MIMO or non-MIMO for each radio frame comprised of a block or a plurality of blocks, and has mapping sections (110-1 to 110-n) that perform mapping of pilot signals to perform propagation path estimation, specific data, and user data, where the mapping sections perform mapping so that the specific data is transmitted in non-MIMO in the block or the radio frame transmitted in MIMO, and that an antenna that transmits the specific data is beforehand associated with an antenna that transmits a pilot signal to perform propagation path estimation.

18 Claims, 24 Drawing Sheets

U.S. PATENT DOCUMENTS

| | | | |
|---|---|---|---|
| 2005/0085195 A1* | 4/2005 | Tong et al. | 455/101 |
| 2005/0152314 A1 | 7/2005 | Sun et al. | |
| 2006/0270364 A1 | 11/2006 | Aoki | |
| 2007/0025236 A1* | 2/2007 | Ma et al. | 370/208 |
| 2008/0085718 A1* | 4/2008 | Kuchibhotla et al. | 455/452.1 |
| 2009/0296563 A1* | 12/2009 | Kishiyama et al. | 370/210 |
| 2010/0014504 A1 | 1/2010 | Sun et al. | |
| 2010/0067590 A1* | 3/2010 | Walton et al. | 375/260 |

FOREIGN PATENT DOCUMENTS

| | | |
|---|---|---|
| JP | 2004-297172 A | 10/2004 |
| JP | 2006-339887 A | 12/2006 |
| WO | WO 2005/046113 A2 | 5/2005 |

OTHER PUBLICATIONS

R1-051196, "Control Channel Mapping for MIMO Antennas in Evolved UTRA OFDMA Downlink", Sharp, Oct. 10-14, 2005.*

R1-060005, "Control Channel Mapping for MIMO Antennas in Evolved UTRA OFDMA Downlink", 3GPP TSG-RAN WG1 LTE Ad Hoc Meeting, Sharp, Jan. 23-25, 2006.*

R1-050828, Panasonic, "Pilot channel multiplexing method for multi-antenna transmission in EUTRA OFDMA based downlink", 3GPP, Aug. 29-Sep. 2, 2005.*

Sharp, Control Channel Mapping for MIMO Antennas in Evolved UTRA OFDMA Downlink, TSG RAN WG1 #43 R1-051339, Nov. 2005, Internet<URL:http://www.3gpp.org/ftp/tsg_ran/WG1_RL1/TSGR1_43/Docs/R1-051339.zip>.

R1-050705 "Pilot Channel Structure in Evolved UTRA Downlink" 3GPP TSG RAN WG1 #42 on LTE London, UK, Aug. 29-Sep. 2, 2005.

R1-050707 "Physical Channels and Multiplexing in Evolved UTRA Downlink" 3GPP TSG RAN WG1 #42 on LTE London, UK, Aug. 29-Sep. 2, 2005.

R1-050852 "CQI-based Transmission Power Control for Control Channel in Evolved UTRA" 3GPP TSG RAN WG1 #42 on LTE London, UK, Aug. 29-Sep. 2, 2005.

"MIMO (Multi Input Multi Output) Related Technique" Website of Japan Patent Office:http//www.jpo.go.jp/shiryou/s_sonota/hyoujun_gijutsu/mimo/3-4-2.pdf#page=3, Mar. 25, 2005.

Nortel: "Proposal for the Downlink Pilots for E-UTRA", 3GPP TSG RAN WG1#42 R1-050893, Aug. 29, 2005, pp. 1-29.

Ketchum, J. et al., "High-Throughput Enhancements for 802.11: Features and Performance", IEEE 802. 11-04/1404r3, Nov. 17, 2004, pp. 1-31, URL<https://mentor.ieee.org/802.11/don/04/11-04-1404-03-000n-qualcomm-complete-proposal-presentation>.

* cited by examiner

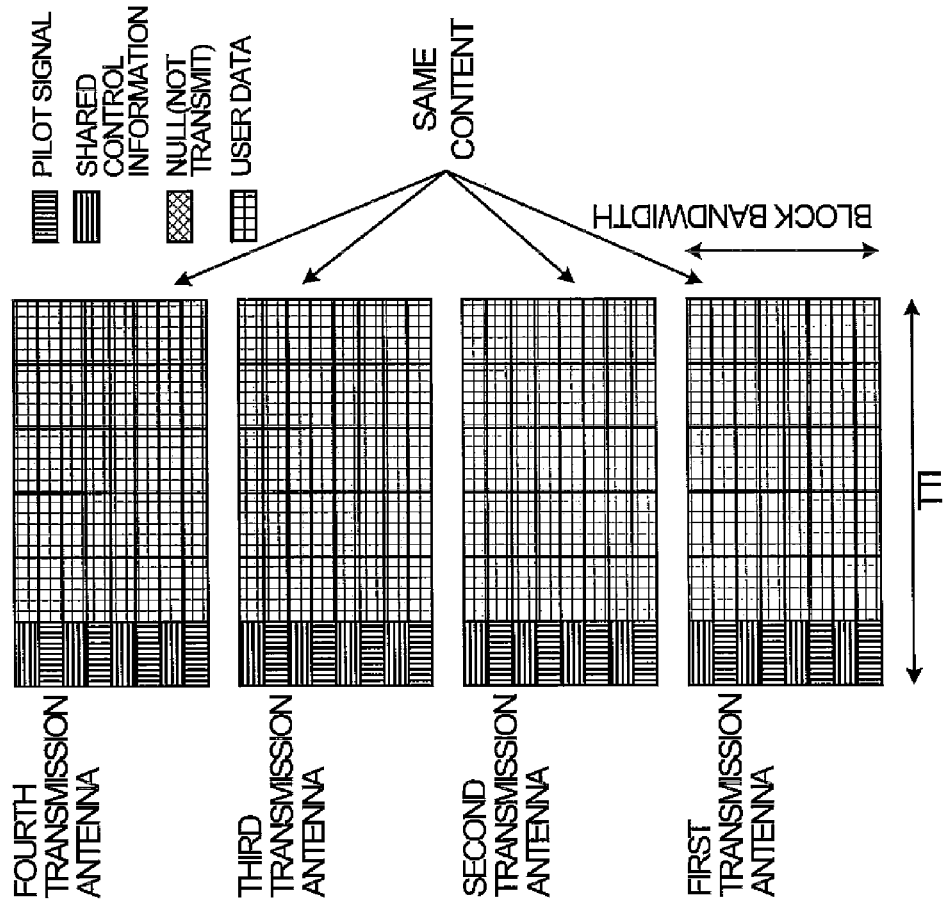
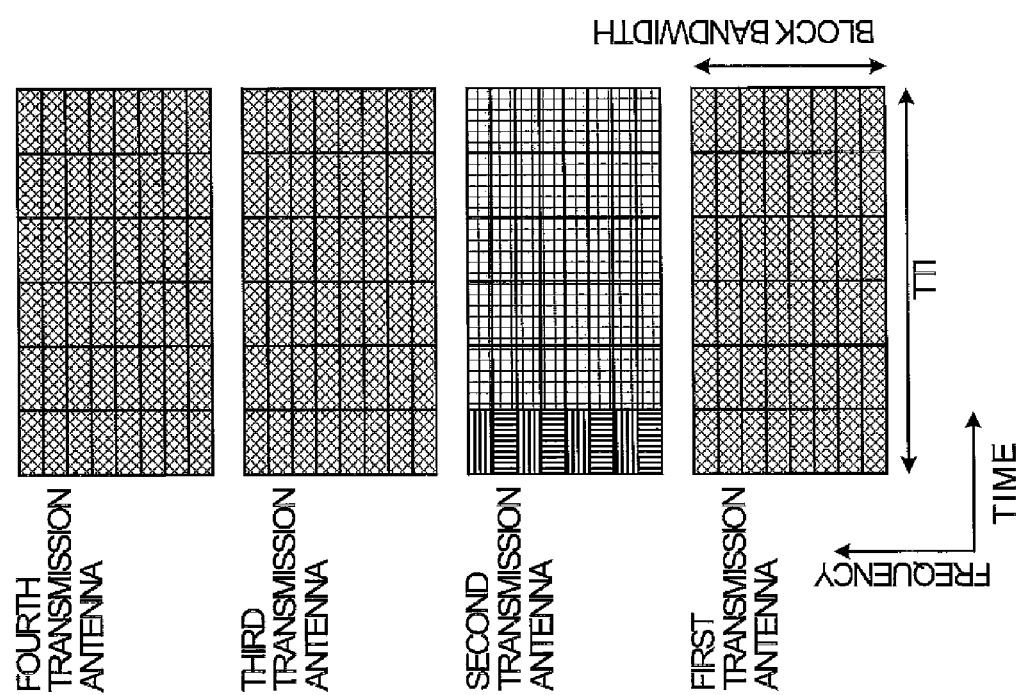
FIG. 3B
FIG. 3A

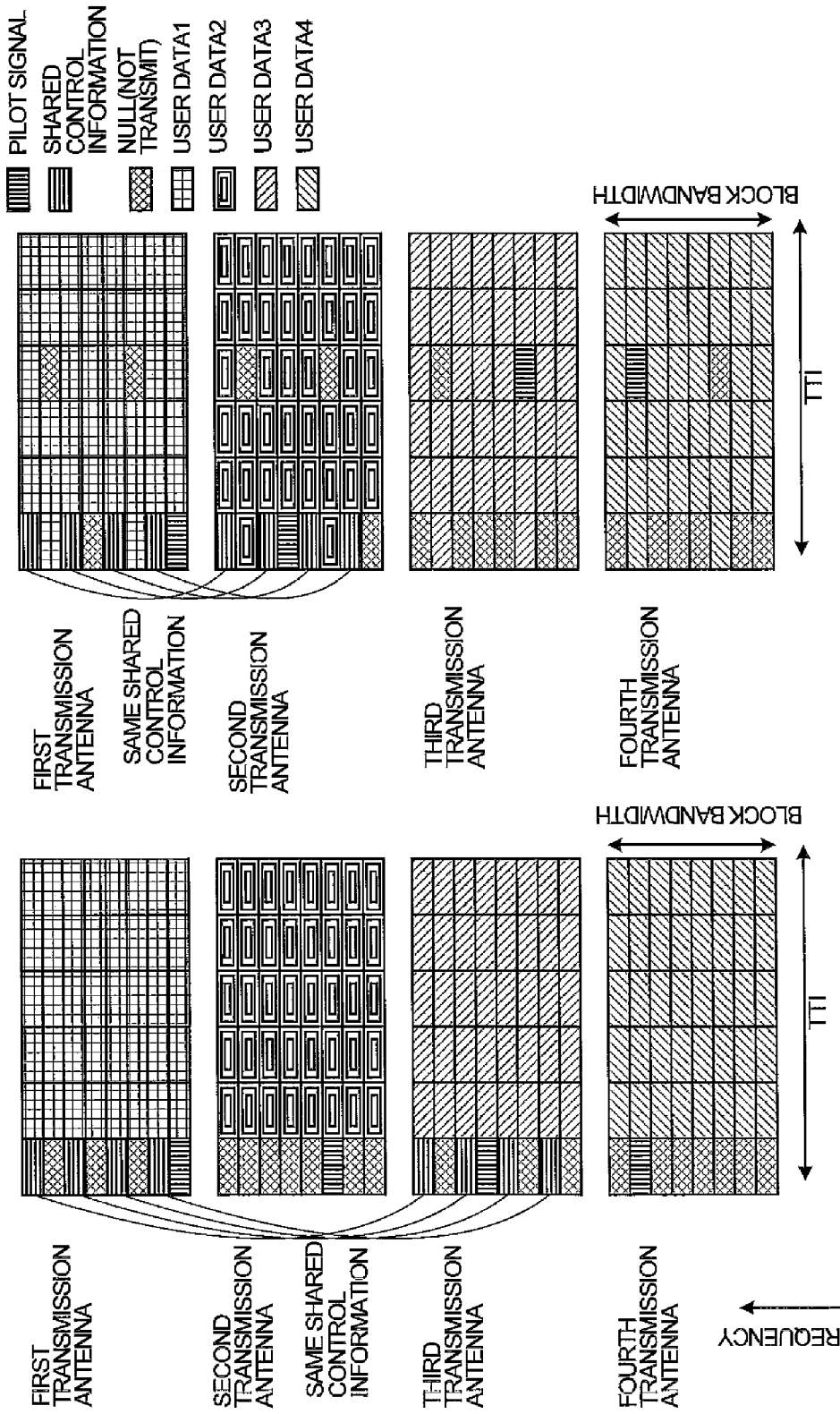

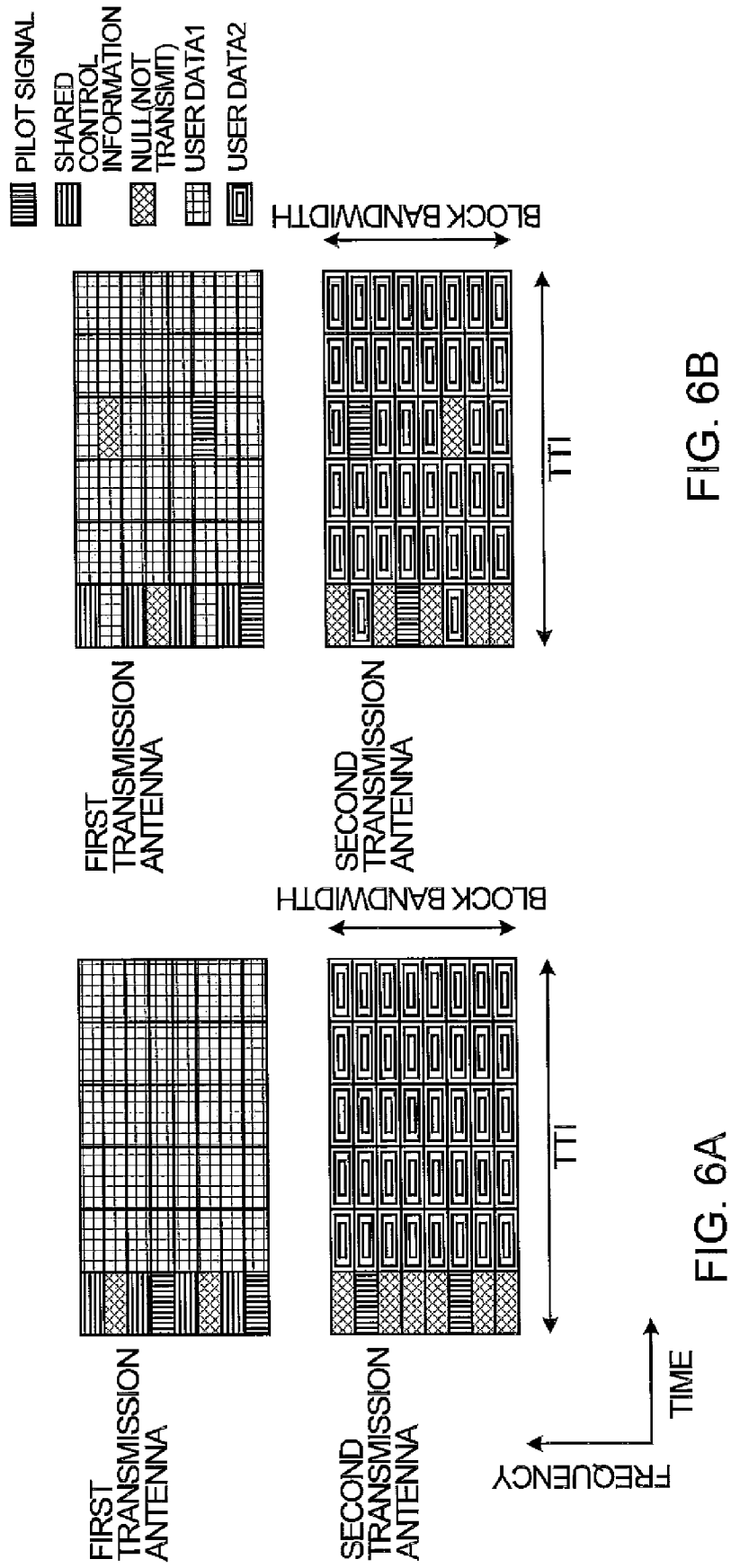

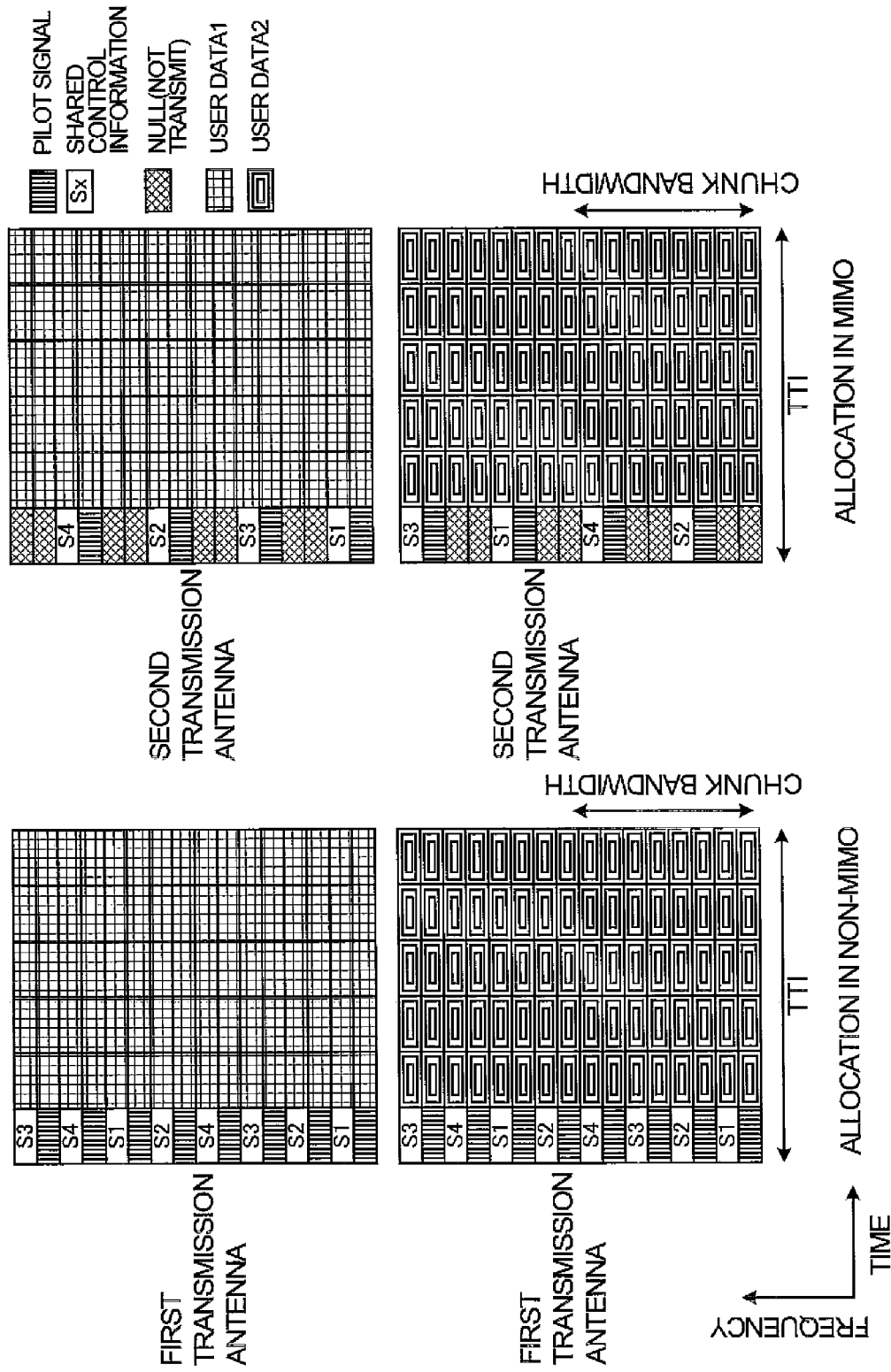

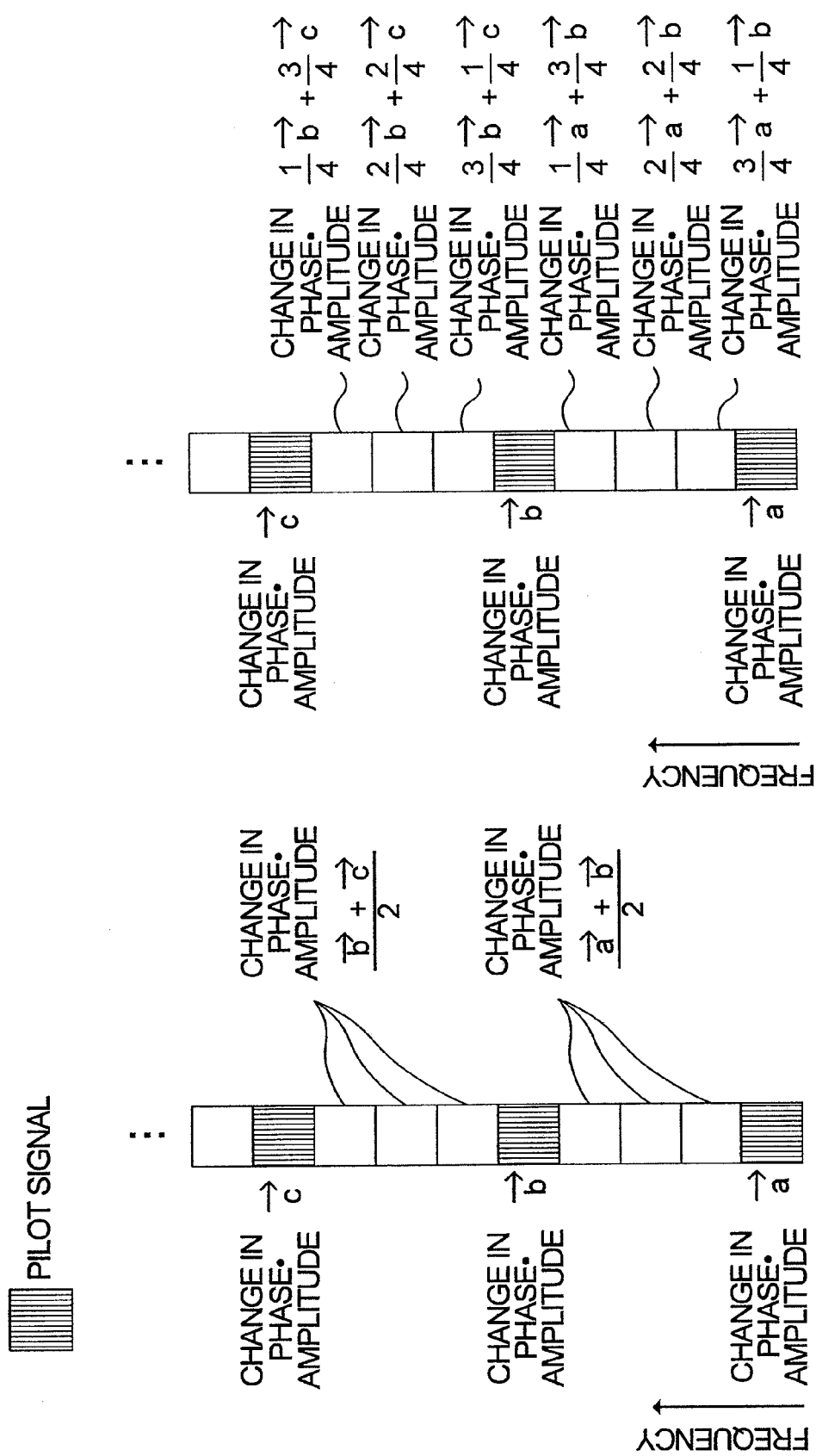

WIRELESS TRANSMITTING APPARATUS, WIRELESS RECEIVING APPARATUS, WIRELESS COMMUNICATION SYSTEM, WIRELESS TRANSMITTING METHOD AND WIRELESS RECEIVING METHOD

TECHNICAL FIELD

The present invention relates to a wireless transmitting apparatus, wireless receiving apparatus, wireless communication system, wireless transmitting method and wireless receiving method for performing estimation of a propagation path of a radio zone, and demodulating a signal using the propagation path estimation result.

BACKGROUND ART

Conventionally, in 3GPP (3rd Generation Partnership Project), the W-CDMA system has been standardized as a 3rd-generation cellular mobile communication system, and the service of the system has been started sequentially. Further, HSDPA (High-Speed Downlink Packet Access) with the communication speed further increased has been standardized, and its service has been about to start.

Meanwhile, evolution of 3rd-generation radio access (Evolved Universal Terrestrial Radio Access: hereinafter referred to as EUTRA) has been studied in 3GPP. The OFDM (Orthogonal Frequency Division Multiplexing) system is proposed for downlink in EUTRA. OFDM is a scheme which is used in IEEE802.11a that is a wireless system of 5 GHz-band and digital terrestrial broadcasting, and which provides simultaneous communications with tens to thousands of carriers allocated in minimum frequency-intervals that do not cause interference in theory. Generally, the carrier is referred to as a subcarrier in OFDM. Then, digital modulation such as PSK, QAM or the like is performed on each subcarrier to perform communications.

FIG. 15 is a diagram showing a configuration example of a downlink radio frame assumed based on the proposal of 3GPP in EUTRA (see Non-patent Documents 1 to 3). As shown in FIG. 15, the downlink radio frame is comprised of a plurality of blocks each of which is a unit radio resource used in communications. There is the case that block is referred to as Chunk.

Further, the block is comprised of a plurality of sub-blocks, with the sub-block as a minimum unit being defined by a sub-channel as a frequency component corresponding to a single or plurality of subcarriers and a sub-slot as a time component corresponding to a single or plurality of OFDM symbols.

The slot is expressed in two dimensions of a block bandwidth on the frequency axis and a slot on the time axis. There is the case that this slot is referred to as TTI (Transmission Time Interval). For example, when it is assumed that the entire downlink band (downlink frequency bandwidth) Ball is 20 MHz, a block bandwidth Bch is 300 kHz, a subcarrier frequency bandwidth Bsc is 15 kHz, a single radio frame length is 10 ms, and that TTI is 0.5 ms, a single radio frame is comprised of sixty blocks on the frequency axis and twenty blocks on the time axis, i.e. 1200 blocks.

Further, one block contains twenty subcarriers, and when the OFDM symbol duration Ts is assumed to be 0.0625 ms, it is calculated that one block contains eight OFDM symbols. Accordingly, as shown in FIG. 16, one block can be expressed by configuration C(f,t) when the number of sub-channels is f and the number of sub-slots is t (in the above-mentioned example, when it is assumed that one sub-channel is one subcarrier, and that one sub-slot is one OFDM symbol, equations of $1 \leq f \leq 20$ and $1 \leq t \leq 8$ hold).

In the block are mapped:
(1) user data for use by a user;
(2) physical and layer 2 control messages (hereinafter, referred to as "shared control information") included in Downlink Shared Control Signaling Channel (DSCSCH) storing a mobile station ID (UE identity), modulation scheme, error correcting scheme, information required for the processing of Hybrid Automatic Repeat reQuest (HARQ), and transmission parameters such as a data length and the like; and
(3) a known pilot signal used in propagation path estimation to demodulate control data and user data.

Further, at the beginning of the radio frame are mapped (1) a synchronization signal to acquire synchronization of the frame and (2) common control information to broadcast the structure of the entire frame.

The shared control information is described in Non-patent Document 2. In other words, Non-patent Document 2 defines as channels in the physical layer:
(1) Pilot channel (Pilot signal);
(2) Common control channel (common control information);
(3) Shared control signaling channel (shared control information);
(4) Shared data channel (user data);
(5) Multicast/Broadcast channel; and
(6) Downlink synchronization channel (synchronization signal).

A block (chunk) to transmit data to a terminal (user, mobile station) is basically comprised of a pilot channel (pilot signal), shared control signaling channel (shared control information) and shared data channel (user data).

The pilot channel (pilot signal) is used in power measurement in performing a cell search and handover, CQI measurement to perform adaptive modulation, and channel estimation to demodulate the shared control information and user data.

The shared control signaling channel (shared control information) includes control information required for demodulation of user data, such as a modulation scheme of the block (chunk), data length, position of data to the terminal in the block (chunk), Hybrid ARQ information, and the like, and further as control information for uplink from the terminal, information of power control, transmission timing control, timing at which the terminal has to transmit, modulation scheme, data length, ACK/NACK to the data transmitted from the terminal, and the like.

The shared data channel (user data) is user data of the above-mentioned block (chunk), and sometimes shared by a plurality of users.

To demodulate the user data, the information of the modulation scheme, data length and the like in the shared control information is indispensable, and to demodulate the shared control information, propagation path compensation is made using the pilot signal.

FIG. 17A is a diagram of a block extracted from FIG. 15, and FIG. 17B is a diagram of another extracted block of a structure with part of pilot signals arranged in the center of TTI as another configuration example that is similarly proposed. In both of FIGS. 17A and 17B, by allocating the shared control information to demodulate the user data at the beginning of the block, it is intended to ease demodulation of user data in the terminal. In other words, since the need is eliminated for processing of storing user data in a buffer until all the shared control information in the block is obtained and the like, it is possible to reduce the circuit scale, and further reduce the demodulation processing delay.

Moreover, the shared control information is data important to demodulate the user data, a noise-immunity fixed modulation scheme such as QPSK or the like is used for the information to prevent the occurrence of demodulation error, and the information is disposed near the pilot signal to enhance propagation path estimation accuracy.

Further, in EUTRA, the MIMO (Multi-Input Multi-Output) technique is used which is a technique of transmitting different signals from a plurality of transmission antennas, and receiving the signals with a plurality of reception antennas to separate the received signals. FIG. 18 is a concept diagram of a communication system using the MIMO technique. In the MIMO technique, a transmitter 100 has a plurality of (M) transmission antennas 101-1 to 101-M, a receiver 102 has a plurality of (N) reception antennas 103-1 to 103-N, and MIMO propagation paths are formed using the transmission antennas 101-1 to 101-M and reception antennas 103-1 to 103-N. Then, a plurality of different data signals is transmitted and received via a plurality of propagation paths by radio signals with the same frequency or in overlapping frequency bands.

Herein, it is assumed in FIG. 18 that a propagation path from the antenna 101-1 to antenna 103-1 is $h_{11}$, a propagation path from the antenna 101-2 to antenna 103-1 is $h_{21}$, a propagation path from the antenna 101-M to antenna 103-1 is $h_{M1}$, and that, a propagation path from the antenna 101-M to antenna 103-N is $h_{MN}$. When it is further assumed that a transmission signal from the antenna 101-1 is $S_1$, a transmission signal from the antenna 101-2 is $S_2$, a transmission signal from the antenna 101-M is $S_M$, a received signal in the antenna 103-1 is $R_1$, a received signal in the antenna 103-2 is $R_2$, and that a received signal in the antenna 103-N is $R_N$, following equation (1) holds.

[Eq. 1]

$$\begin{pmatrix} R_1 \\ R_2 \\ \vdots \\ R_N \end{pmatrix} = \begin{pmatrix} h_{11} & h_{21} & \ldots & h_{M1} \\ h_{12} & h_{22} & \ldots & h_{M2} \\ \vdots & \vdots & \ddots & \vdots \\ h_{1N} & h_{2N} & \ldots & h_{MN} \end{pmatrix} \cdot \begin{pmatrix} S_1 \\ S_2 \\ \vdots \\ S_M \end{pmatrix} \quad (1)$$

To obtain each h with ease, for example, when it is assumed that M=2 and N=2, it is considered that sub-slots including pilot signals as shown in FIG. 17A are configured as shown in FIG. 19. In other words, it is controlled that on the sub-channel to transmit the pilot signal from the first transmission antenna, a signal is not transmitted from the second antenna. In the receiver, using only the pilot signals transmitted from the first transmission antenna among received pilot signals, it is possible to estimate propagation paths $h_{11}$ and $h_{12}$ by performing linear interpolation, averaging and the like among the pilots. Similarly, using only the pilot signals transmitted from the second transmission antenna among received pilot signals, it is possible to estimate propagation paths $h_{21}$ and $h_{22}$. Next, the receiver generates candidates $S'_1$ and $S'_2$ for the transmission signal, and obtains $R'_1$ and $R'_2$ from equation (2) as described below.

[Eq. 2]

$$\begin{pmatrix} R'_1 \\ R'_2 \end{pmatrix} = \begin{pmatrix} h_{11} & h_{21} \\ h_{12} & h_{22} \end{pmatrix} \cdot \begin{pmatrix} S'_1 \\ S'_2 \end{pmatrix} \quad (2)$$

Then, a difference is obtained between R' obtained in the above-mentioned equation and received signal R, and S' that minimizes the difference is output as a signal S to be desired. This method is called MLC(Maximum Likelihood Detection), and further, another reception method is considered such as QRM-MLD as shown in Non-patent Document 4 although descriptions thereof are omitted herein.

When configurations in one block for each antenna in using the MIMO technique are defined as $C1(f,t)$, $C2(f,t)$, ..., $CM(f,t)$, pilot signals are required for each antenna to use the MIMO technique. For example, when the number of transmission antennas is two (M=2), such a block structure has been proposed that as shown in FIG. 20, in a position in the configuration where a pilot signal is transmitted from the first antenna, a pilot signal is not transmitted from the other transmission antenna (second transmission antenna) (null is disposed), thereby enabling the receiver to receive the independent pilot signal for each antenna, and that the other shared control information and user data is transmitted concurrently from each antenna.

As described above, the MIMO technique is a technique applicable on a block basis, and it is possible to provide both a MIMO block and non-MIMO block in a frame of EUTRA.

Using the frame structure as described above, described next is transmission and reception assumed based on the proposal of 3GPP with reference to drawings. FIG. 21 is a block diagram showing a schematic configuration of a conventional transmitter, and FIGS. 22 and 23 are block diagrams showing schematic configurations of conventional receivers. In addition, in the following description, it is assumed that a single block in a single radio frame is assigned to a single user. However, without being limited thereto, one user may use a plurality of blocks, or one block may be shared by a plurality of users.

As shown in FIG. 21, for example, in the transmitter in a base station, transmission data (shared control information and user data) for each user subjected to modulation processing is input to mapping circuits 120-1 to 120-n of each block together with a pilot signal. Each of the mapping circuits 120-1 to 120-n is comprised of a selector 120a, splitter 120b, and memories 120c-1 to 120c-M, and to provide the block structure as shown in FIG. 17A, the transmission data of each user and the pilot signal is arranged on the memories (configuration of FIG. 16) via the selector 120a and splitter 120b. Herein, in the block using the MIMO technique, the pilot signal is allocated to the memory of each antenna from the selector 120a, and the shared control information and user data is output to the memory of each antenna from the splitter 120b. In the block without using the MIMO technique, the same pilot signal and transmission data is allocated for all the antennas.

Signals allocated onto the memories in each of the mapping circuits 120-1 to 120-n are sequentially output to F/T transform circuits 121-1 to 121-M for each antenna, starting with the beginning of the frame, and signals of the entire band are transformed by IFFT (Inverse Fast Fourier Transform) computation from signals in the frequency domain to signals in the time domain. The transformed signals are converted into analog signals in D/A conversion circuits 122-1 to 122-M, further converted into signals with frequencies to transmit in the frequency conversion circuits 123-1 to 123-M, and then, transmitted from a first transmission antenna 124-1 to Mth transmission antenna 124-M.

The terminal is beforehand notified of whether a block to the terminal is transmitted as a MIMO signal or a non-MIMO signal by advance information such as the common control information or the like. Based on the notified advance information, when the block to the terminal is a non-MIMO signal, the terminal demodulates the data by the following processing using the receiver as shown in FIG. 22. In other words, as shown in FIG. 22, the signal received in an antenna 130 is converted into a signal with an intermediate frequency in a frequency conversion circuit 131. The analog signal converted into the intermediate frequency is converted into a digital signal in an A/D conversion circuit 132, and output to a T/F transform circuit 133.

The signal input to the T/F transform circuit 133 is subjected to FFT (Fast Fourier Transform) computation, and the signal in the time domain is thereby transformed into the signal in the frequency domain. A propagation path estimating circuit 134 calculates a propagation path estimation value for each sub-channel from the change in phase•amplitude of the pilot signal that is a known signal, and outputs the value to a propagation path compensating circuit 135. Using the estimation value calculated in the propagation path estimating circuit 134, the propagation path compensating circuit 135 compensates the received signal transformed in the T/F transform circuit 133 to be a transmission signal prior to being changed by the propagation path. A data demodulation circuit 136 demodulates the data signal compensated in the propagation path compensating circuit 135.

Herein, as the method of calculating an estimation value in the propagation path estimating circuit 134, for example, methods as shown in FIG. 24A and FIG. 24B and the like can be adopted. The method as shown in FIG. 24A is to obtain an average of changes in phase•amplitude of a plurality of pilot signals, and use the obtained average value as the change in phase•amplitude of a sub-channel positioned between the pilot signals. The method as shown in FIG. 24B is to make linear interpolation of changes in phase•amplitude of a plurality of pilot signals, and use the obtained interpolation value as the change in phase•amplitude of a sub-channel positioned between the pilot signals.

Meanwhile, when the block to the terminal is a MIMO signal, the terminal demodulates the data by the following processing using the receiver of FIG. 23. In other words, as shown in FIG. 23, received signals received in a first reception antenna 140-1 to Nth reception antenna 140-N are converted into signals with the intermediate frequency in frequency conversion circuits 141-1 to 141-N, and then, converted into digital signals in A/D conversion circuits 142-1 to 142-N. The digital signals in the time domain converted in the A/D conversion circuits 142-1 to 142-N are transformed into signals in the frequency domain by FFT computation in T/F transform circuits 143-1 to 143-N, and output to an MLD (Maximum-Likelihood Detection) circuit 144. The MLD circuit 144 has a propagation path estimating circuit 145, metric circuit 146, and comparing circuit 147, performs propagation path estimation and demodulation processing of the data, and outputs reception data.

Non-patent Document 1: R1-050705 "Pilot Channel Structure in Evolved UTRA Downlink" 3GPP TSG RAN WG1 #42 on LTE London, UK, Aug. 29-Sep. 2, 2005

Non-patent Document 2: R1-050707 "Physical Channels and Multiplexing in Evolved UTRA Downlink" 3GPP TSG RAN WG1 #42 on LTE London, UK, Aug. 29-Sep. 2, 2005

Non-patent Document 3: R1-050852 "CQI-based Transmission Power Control for Control Channel in Evolved UTRA" 3GPP TSG RAN WG1 #42 on LTE London, UK, Aug. 29-Sep. 2, 2005

Non-patent Document 4: "MIMO (Multi Input Multi Output) Related Technique" Website of Japan Patent Office: http://www.jpo.go.jp/shiryou/s_sonota/hyoujun/gijutsu/mimo/mokuji.htm

DISCLOSURE OF INVENTION

Problems to be Solved by the Invention

However, in the conventional technique, generally, since different demodulation methods are used in a MIMO block and non-MIMO block, it is necessary to beforehand notify whether a block is transmitted as a MIMO signal or non-MIMO signal by advance information such as common control information or the like. Further, in the MIMO block, it is not possible to perform demodulation processing of the shared control information until pilot signals are received from all transmission antennas.

The present invention is carried out in view of such circumstances, and it is an object of the invention to provide a wireless transmitting apparatus, wireless receiving apparatus, wireless communication system, wireless transmitting method and wireless receiving method enabling shared control information to be demodulated without requiring advance information on a MIMO block or non-MIMO block prior to demodulation of the shared control information of the block, and further enabling the shared control information to be demodulated early.

Means for Solving the Problem (1) To achieve the aforementioned object, the present invention takes following means. In other words, a wireless communication apparatus according to the invention is a wireless transmitting apparatus that has a plurality of antennas and that performs wireless transmission in MIMO or non-MIMO on a radio frame basis using an OFDM signal, where the radio frame is comprised of a block or a plurality of blocks each comprised of a plurality of sub-blocks with a sub-block as a minimum unit being defined by a sub-channel as a frequency component corresponding to a single or a plurality of subcarriers and a sub-slot as a time component corresponding to a single or a plurality of OFDM symbols, and is characterized by having a mapping section that performs mapping of a pilot signal to perform propagation path estimation, specific data, and user data, where the mapping section performs mapping so that the specific data is transmitted in non-MIMO in the block or the radio frame transmitted in MIMO, and that an antenna that transmits the specific data is beforehand associated with an antenna that transmits the pilot signal to perform propagation path estimation.

Thus, since mapping is performed so that the specific data is transmitted in non-MIMO in the block or the radio frame transmitted in MIMO, and that an antenna that transmits the specific data is beforehand associated with an antenna that transmits the pilot signal to perform propagation path estimation, the receiving side is capable of grasping the content of the specific data in the stage of receiving the sub-block including the specific data. Particularly, when the specific data is mapped into the beginning of the block, the receiving side is capable of grasping the content indicated by the specific data only by receiving one sub-block of the beginning. Accordingly, for example, when the specific data includes information of a destination, it is possible to grasp whether or not the block is to the terminal in the stage of receiving the sub-block of the beginning, and it is thus possible to early determine whether or not to demodulate a subsequently arriving sub-block or block. As a result, power reduction can be made on the receiving side. Further, when the specific data mapped into the beginning of the block includes information indicating whether transmission is in MIMO or non-MIMO, the receiving side is capable of determining MIMO or non-MIMO in the stage of receiving the specific data, and therefore, the need is eliminated for notifying advance information to notify whether transmission is in MIMO or non-MIMO.

(2) Further, in the wireless transmitting apparatus according to the invention, the mapping section is characterized by performing mapping in the block or the radio frame to perform wireless transmission in MIMO so that an antenna that transmits the specific data is the same as an antenna that transmits a pilot signal with a frequency component nearest the specific data in the same sub-slot.

Thus, mapping is performed so that an antenna that transmits the specific data is the same as an antenna that transmits a pilot signal with a frequency component nearest the specific data in the same sub-slot, and it is thus possible to enhance accuracy in propagation path estimation on the receiving side. Further, since the specific data mapped in the block to perform wireless transmission in MIMO is transmitted as a radio signal in non-MIMO, the receiving side is capable of demodulating the specific data in either MIMO or non-MIMO. Accordingly, for example, when the specific data includes information of a destination, it is possible to grasp whether or not the block is to the terminal in the stage of receiving the sub-block of the beginning, and it is thus possible to early determine whether or not to demodulate a subsequently arriving sub-block or block. As a result, power reduction can be made on the receiving side. Further, when the specific data mapped into the beginning of the block includes information indicating whether transmission is in MIMO or non-MIMO, the receiving side is capable of determining MIMO or non-MIMO in the stage of receiving the specific data, and therefore, the need is eliminated for notifying advance information to notify whether transmission is in MIMO or non-MIMO. Furthermore, the invention adopts such a configuration, and therefore, is capable of being carried into practice without making a modification to the block (Chunk) structure currently proposed by 3GPP.

(3) Further, in the wireless transmitting apparatus according to the invention, the mapping section is characterized by performing mapping in the block or the radio frame to perform wireless transmission in MIMO so that an antenna that transmits the specific data is the same as an antenna that transmits a pilot signal nearest the specific data on the low frequency side or the high frequency side in the same sub-slot.

Thus, mapping is performed so that an antenna that transmits the specific data is the same as an antenna that transmits a pilot signal nearest the specific data on the low frequency side or the high frequency side in the same sub-slot, and it is thus possible to enhance accuracy in propagation path estimation on the receiving side, while the need is eliminated for calculating the distance between the nearest pilot signal and the specific data. Further, since the specific data mapped in the block to perform wireless transmission in MIMO is transmitted as a radio signal in non-MIMO, the receiving side is capable of demodulating the specific data in either MIMO or non-MIMO. Accordingly, for example, when the specific data includes information of a destination, it is possible to grasp whether or not the block is to the terminal in the stage of receiving the sub-block of the beginning, and it is thus possible to early determine whether or not to demodulate a subsequently arriving sub-block or block. As a result, power reduction can be made on the receiving side. Further, when the specific data mapped into the beginning of the block includes information indicating whether transmission is in MIMO or non-MIMO, the receiving side is capable of determining MIMO or non-MIMO in the stage of receiving the specific data, and therefore, the need is eliminated for notifying advance information to notify whether transmission is in MIMO or non-MIMO. Furthermore, the invention adopts such a configuration, and therefore, is capable of being carried into practice without making a modification to the block (Chunk) structure currently proposed by 3GPP.

(4) Further, in the wireless transmitting apparatus according to the invention, the mapping section is characterized by performing mapping in the block or the radio frame to perform wireless transmission in MIMO so that an antenna that transmits the specific data is a predetermined single or plurality of antennas.

Thus, mapping is performed in the block or the radio frame to perform wireless transmission in MIMO so that an antenna that transmits the specific data is a predetermined single or plurality of antennas, and it is thus possible to simplify the mapping operation and the demodulation operation on the receiving side. Further, since the specific data mapped in the block to perform wireless transmission in MIMO is transmitted as a radio signal in non-MIMO, the receiving side is capable of demodulating the specific data in either MIMO or non-MIMO. Accordingly, for example, when the specific data includes information of a destination, it is possible to grasp whether or not the block is to the terminal in the stage of receiving the sub-block of the beginning, and it is thus possible to early determine whether or not to demodulate a subsequently arriving sub-block or block. As a result, power reduction can be made on the receiving side. Further, when the specific data mapped into the beginning of the block includes information indicating whether transmission is in MIMO or non-MIMO, the receiving side is capable of determining MIMO or non-MIMO in the stage of receiving the specific data, and therefore, the need is eliminated for notifying advance information to notify whether transmission is in MIMO or non-MIMO. Furthermore, the invention adopts such a configuration, and therefore, is capable of being carried into practice without making a modification to the block (Chunk) structure currently proposed by 3GPP.

(5) Further, in the wireless transmitting apparatus according to the invention, it is a feature that the predetermined antenna is selected based on reception quality information of each transmission antenna acquired from the communicating party.

Thus, since the antenna is selected based on reception quality information of each transmission antenna acquired from the communicating party, it is possible to transmit a signal while gathering power into only a transmission antenna providing good reception quality, and as a result, demodulation error can be reduced on the receiving side. Further, since the specific data mapped in the block to perform wireless transmission in MIMO is transmitted as a radio signal in non-MIMO, the receiving side is capable of demodulating the specific data in either MIMO or non-MIMO. Accordingly, for example, when the specific data includes information of a destination, it is possible to grasp whether or not the block is to the terminal in the stage of receiving the sub-block of the beginning, and it is thus possible to early determine whether or not to demodulate a subsequently arriving sub-block or block. As a result, power reduction can be made on the receiving side. Further, when the specific data mapped into the beginning of the block includes information indicating whether transmission is in MIMO or non-MIMO, the receiving side is capable of determining MIMO or non-MIMO in the stage of receiving the specific data, and therefore, the need is eliminated for notifying advance information to notify whether transmission is in MIMO or non-MIMO. Furthermore, the invention adopts such a configuration, and therefore, is capable of being carried into practice without making a modification to the block (Chunk) structure currently proposed by 3GPP.

(6) Further, in the wireless transmitting apparatus according to the invention, the mapping section is characterized by performing mapping in the block to perform wireless transmission in MIMO so that an antenna that transmits the specific data is all the antennas that transmit pilot signals allocated in the sub-slot including the specific data.

Thus, since mapping in the block to perform wireless transmission in MIMO is performed so that an antenna that transmits the specific data is all the antennas that transmit pilot signals allocated in the sub-slot including the specific data, the receiving side is capable of obtaining the change in phase•amplitude of each antenna using pilot signals for each antenna in the MIMO block, and by combining the values, compensating the propagation path of the specific data with high accuracy. Further, since the specific data mapped in the block to perform wireless transmission in MIMO is transmitted as a radio signal in non-MIMO, the receiving side is capable of demodulating the specific data in either MIMO or non-MIMO. Accordingly, for example, when the specific data includes information of a destination, it is possible to grasp whether or not the block is to the terminal in the stage of receiving the sub-block of the beginning, and it is thus possible to early determine whether or not to demodulate a subsequently arriving sub-block or block. As a result, power reduction can be made on the receiving side. Further, when the specific data mapped into the beginning of the block includes information indicating whether transmission is in MIMO or non-MIMO, the receiving side is capable of determining MIMO or non-MIMO in the stage of receiving the specific data, and therefore, the need is eliminated for notifying advance information to notify whether transmission is in MIMO or non-MIMO. Furthermore, the invention adopts such a configuration, and therefore, is capable of being carried into practice without making a modification to the block (Chunk) structure currently proposed by 3GPP.

(7) Further, in the wireless transmitting apparatus according to the invention, it is another feature that the specific data is a control signal including at least a destination of the user data, and information on whether or not the block is a MIMO block.

Thus, since the specific data is a control signal including at least a destination of the user data, and information on whether or not the block is a MIMO block, when the specific data is mapped into the beginning of the block, the receiving side is capable of grasping the content indicated by the specific data only by receiving one sub-block of the beginning. In other words, it is possible to grasp whether or not the block is to the terminal in the stage of receiving the sub-block of the beginning, and it is thus possible to early determine whether or not to demodulate a subsequently arriving sub-block or block. As a result, power reduction can be made on the receiving side. Further, the receiving side is capable of determining MIMO or non-MIMO in the stage of receiving the specific data, and therefore, the need is eliminated for notifying advance information to notify whether transmission is in MIMO or non-MIMO.

(8) Further, in the wireless transmitting apparatus according to the invention, it is another feature that the specific data is comprised of a plurality of same portions, and that the plurality of same portions is transmitted from respective different antennas when transmission is performed using a plurality of antennas.

Thus, since the specific data is comprised of a plurality of same portions, symbol repetitions are made, and the gain can be increased. Further, when transmission is performed using a plurality of antennas, a plurality of same portions is transmitted from respective different antennas, and it is thereby possible to obtain more sophisticated diversity effect.

(9) Further, a wireless receiving apparatus according to the invention is a wireless receiving apparatus that receives an OFDM signal wirelessly transmitted from the wireless transmitting apparatus as described in claim 1, and is characterized by having a propagation path estimating section that performs propagation path estimation using a received pilot signal, and a propagation path compensating section that compensates the specific data and the user data for the propagation path from an estimation value calculated in the propagation path estimating section, where the propagation path compensating section uses a propagation path estimation value calculated using a beforehand associated pilot signal in compensating the specific data for the propagation path.

Thus, a propagation path estimation value calculated using a beforehand associated pilot signal is used in compensating the specific data for the propagation path, and it is thereby possible to enhance accuracy in propagation path estimation. Further, by performing estimation of the propagation path while assuming that a radio signal received in the reception antenna is a radio signal transmitted in non-MIMO, when the specific data mapped in the block to perform wireless transmission in MIMO in the communicating party (transmitting side) is transmitted as a radio signal non-MIMO, it is possible to demodulate the specific data either in MIMO or non-MIMO. As a result, without making a modification to the block (Chunk) structure currently proposed by 3GPP, it is possible to construct a system that does not require the advance information to notify whether transmission is in MIMO or non-MIMO.

(10) Further, in the wireless receiving apparatus according to the invention, the propagation path estimating section is characterized by using a propagation path estimation value calculated using a pilot signal received in a frequency nearest the frequency in which the specific data is received in the same sub-slot, in compensating the specific data for the propagation path.

Thus, a propagation path estimation value calculated using a pilot signal received in a frequency nearest the frequency in which the specific data is received in the same sub-slot is used in compensating the specific data for the propagation path, and it is thus possible to enhance accuracy in propagation path estimation, while eliminating the need for calculating the distance between the nearest pilot signal and the specific data. Further, by performing estimation of the propagation path while assuming that a radio signal received in the reception antenna is a radio signal transmitted in non-MIMO, when the specific data mapped in the block to perform wireless transmission in MIMO in the communicating party (transmitting side) is transmitted as a radio signal in non-MIMO, it is possible to demodulate the specific data either in MIMO or non-MIMO. As a result, without making a modification to the block (Chunk) structure currently proposed by 3GPP, it is possible to construct a system that does not require the advance information to notify whether transmission is in MIMO or non-MIMO.

(11) Further, in the wireless receiving apparatus according to the invention, the propagation path estimating section is characterized by using a propagation path estimation value calculated using a pilot signal received in a frequency lower than and nearest the frequency in which the specific data is received in the same sub-slot or in a frequency higher than and nearest the frequency in which the specific data is received, in compensating the specific data for the propagation path.

Thus, a propagation path estimation value calculated using a pilot signal received in a frequency lower than and nearest the frequency in which the specific data is received in the same sub-slot or in a frequency higher than and nearest the frequency in which the specific data is received is used in compensating the specific data for the propagation path, and it is thus possible to enhance accuracy in propagation path estimation. Further, by performing estimation of the propagation path while assuming that a radio signal received in the reception antenna is a radio signal transmitted in non-MIMO, when the specific data mapped in the block to perform wireless transmission in MIMO in the communicating party (transmitting side) is transmitted as a radio signal in non-MIMO, it is possible to demodulate the specific data either in MIMO or non-MIMO. As a result, without making a modification to the block (Chunk) structure currently proposed by 3GPP, it is possible to construct a system that does not require the advance information to notify whether transmission is in MIMO or non-MIMO.

(12) Further, a wireless receiving apparatus according to the invention is a wireless receiving apparatus that notifies a communicating parry of reception quality of a radio signal transmitted from each transmission antenna of the communicating party for each transmission antenna, and the propagation path estimating section is characterized by using a propagation path estimation value calculated using a pilot signal transmitted from a single or a plurality of antennas with the reception quality measurement result being good in compensating the specific data for the propagation path.

Thus, a propagation path estimation value calculated using a pilot signal transmitted from a single or plurality of antennas with the reception quality measurement result being good is used in compensating the specific data for the propagation path, and it is thus possible to enhance accuracy in propagation path estimation. Further, by performing estimation of the propagation path while assuming that a radio signal received in the reception antenna is a radio signal transmitted in non-MIMO, when the specific data mapped in the block to perform wireless transmission in MIMO in the communicating party (transmitting side) is transmitted as a radio signal in non-MIMO, it is possible to demodulate the specific data either in MIMO or non-MIMO. As a result, without making a modification to the block (Chunk) structure currently proposed by 3GPP, it is possible to construct a system that does not require the advance information to notify whether transmission is in MIMO or non-MIMO.

(13) Further, a wireless communication system according to the invention is characterized by being comprised of any one of combinations of the described wireless transmitting apparatuses and the described wireless receiving apparatuses.

According to this configuration, it is possible to enhance accuracy in propagation path estimation on the receiving side. Further, since the specific data mapped in the block to perform wireless transmission in MIMO is transmitted as a radio signal in non-MIMO on the transmitting side, the receiving side is capable of demodulating the specific data either in MIMO or non-MIMO. As a result, without making a modification to the block (Chunk) structure currently proposed by 3GPP, the need is eliminated for notifying advance information to notify whether transmission is in MIMO or non-MIMO.

(14) Further, a wireless transmitting method according to the invention is a wireless transmitting method for performing wireless transmission in MIMO or non-MIMO on a radio frame basis using an OFDM signal, where the radio frame is comprised of a block or a plurality of blocks each comprised of a plurality of sub-blocks with a sub-block as a minimum unit being defined by a sub-channel as a frequency component corresponding to a single or a plurality of subcarriers and a sub-slot as a time component corresponding to a single or a plurality of OFDM symbols, and is characterized by at least including a mapping step of performing mapping of a pilot signal to perform propagation path estimation, specific data, and user data, where in the mapping step, mapping is performed so that the specific data is transmitted as a non-MIMO signal irrespective of the MIMO block or radio frame, or non-MIMO block or radio frame, and that an antenna that transmits the specific data is beforehand associated with an antenna that transmits the pilot signal to perform propagation path estimation.

Thus, since mapping is performed so that the specific data is transmitted in non-MIMO in the block or the radio frame transmitted in MIMO, and that an antenna that transmits the specific data is beforehand associated with an antenna that transmits the pilot signal to perform propagation path estimation, the receiving side is capable of grasping the content of the specific data in the stage of receiving the sub-block including the specific data. Particularly, when the specific data is mapped into the beginning of the block, the receiving side is capable of grasping the content indicated by the specific data only by receiving one sub-block of the beginning. Accordingly, for example, when the specific data includes information of a destination, it is possible to grasp whether or not the block is to the terminal in the stage of receiving the sub-block of the beginning, and it is thus possible to early determine whether or not to demodulate a subsequently arriving sub-block or block. As a result, power reduction can be made on the receiving side. Further, when the specific data mapped into the beginning of the block includes information indicating whether transmission is in MIMO or non-MIMO, the receiving side is capable of determining MIMO or non-MIMO in the stage of receiving the specific data, and therefore, the need is eliminated for notifying advance information to notify whether transmission is in MIMO or non-MIMO.

(15) Further, in the wireless transmitting method according to the invention, it is a feature that the specific data is comprised of a plurality of same portions, and that the plurality of same portions is transmitted from respective different antennas when transmission is performed using a plurality of antennas.

Thus, since the specific data is comprised of a plurality of same portions, symbol repetitions are made, and the gain can be increased. Further, when transmission is performed using a plurality of antennas, a plurality of same portions is transmitted from respective different antennas, and it is thereby possible to obtain more sophisticated diversity effect.

(16) Further, a wireless receiving method according to the invention is a wireless receiving method for receiving an OFDM signal wirelessly transmitted by the wireless transmitting method as described in claim 14 or 15, and is characterized by having a step of performing propagation path estimation using a received pilot signal, and a step of compensating the specific data and the user data for the propagation path from the calculated propagation path estimation value, where the step of compensating for the propagation path uses a propagation path estimation value calculated using a beforehand associated pilot signal in compensating the specific data for the propagation path.

Thus, a propagation path estimation value calculated using a beforehand associated pilot signal is used in compensating the specific data for the propagation path, and it is thereby possible to enhance accuracy in propagation path estimation. Further, by performing estimation of the propagation path while assuming that a radio signal received in the reception antenna is a radio signal transmitted in non-MIMO, when the specific data mapped in the block to perform wireless transmission in MIMO in the communicating party (transmitting side) is transmitted as a radio signal in non-MIMO, it is possible to demodulate the specific data either in MIMO or non-MIMO. As a result, without making a modification to the block (Chunk) structure currently proposed by 3GPP, it is possible to construct a system that does not require the advance information to notify whether transmission is in MIMO or non-MIMO.

ADVANTAGEOUS EFFECT OF THE INVENTION

Thus, according to the invention, mapping is performed so that the specific data in a block transmitted in MIMO is transmitted as a non-MIMO signal from the same transmission antenna as that for the beforehand associated pilot signal, and the receiving side is thereby capable of performing propagation path estimation of the specific data using the pilot signal associated with the specific data in the stage of receiving a sub-slot including the specific data, and grasping the content of the specific data using non-MIMO demodulation means. Particularly, when the specific data is mapped into the beginning of the block, the receiving side is capable of grasping the content indicated by the specific data only by receiving one sub-block of the beginning. Accordingly, for example, when the specific data includes information of a destination, it is possible to grasp whether or not the block is to the terminal in the stage of receiving the sub-block of the beginning, and it is thus possible to early determine whether or not to demodulate a subsequently arriving sub-block or block. As a result, power reduction can be made on the receiving side. Further, when the specific data mapped into the beginning of the block includes information indicating whether transmission is in MIMO or non-MIMO, the receiving side is capable of determining MIMO or non-MIMO in the stage of receiving the specific data, and therefore, the need is eliminated for notifying advance information to notify whether the block is transmitted in MIMO or non-MIMO.

BRIEF DESCRIPTION OF DRAWINGS

FIGS. 3A and 3B are diagrams showing block structures in the embodiments of the invention;

FIGS. 5A and 5B are diagrams showing block structures in the second embodiment;

FIGS. 6A and 6B are diagrams showing block structures in the third embodiment;

FIGS. 13A and 13B are another diagrams showing block structures in the sixth embodiment;

FIGS. 24A and 24B are diagrams showing the method of calculating an estimation value in the conventional propagation path estimating circuit.

DESCRIPTION OF SYMBOLS

1-1 to 1-N First to Nth reception antennas
2-1 to 2-N Frequency conversion circuit
3-1 to 3-N A/D conversion circuit
4-1 to 4-N T/F transform circuit
5 Propagation path estimating circuit
6 Propagation path compensating circuit
7 Data demodulation circuit
7*a* Divider
7*b* Combiner
7*c* Demodulator
7*d* Decoder
8 MLD circuit
9 Selector
10 Judging circuit
110-1 to 110-n Mapping circuit
110*a* Selector
110*b*-1 to 110*b*-M Memory
110*c* Splitter
110*d* Duplicator
111-1 to 111-N F/T transform circuit
112-1 to 112-M D/A conversion circuit
113-1 to 113-M Frequency conversion circuit
114-1 to 114-M First to Mth transmission antennas

BEST MODE FOR CARRYING OUT THE INVENTION

Figure 1:
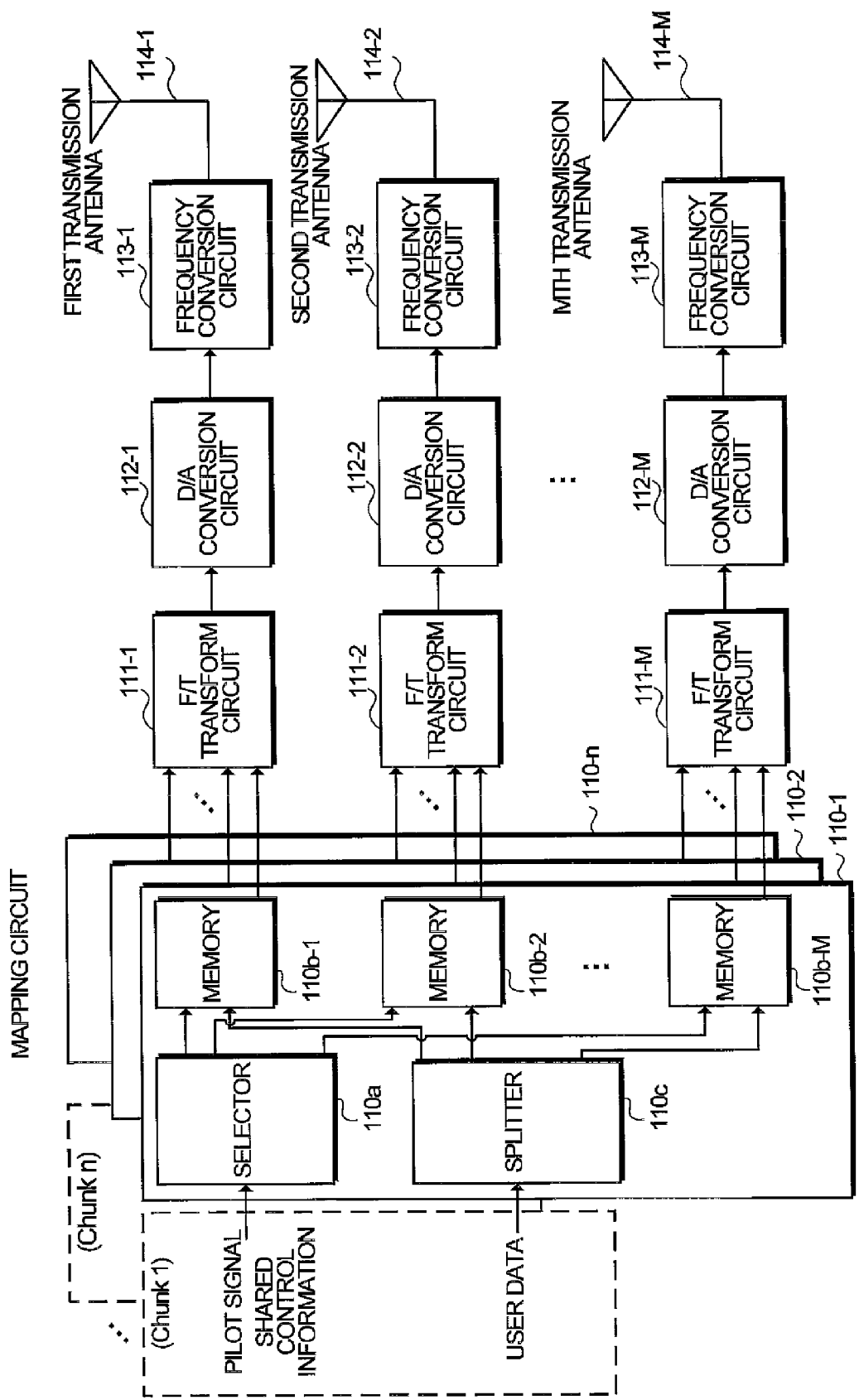
FIG. 1 is a block diagram showing a schematic configuration of a transmitter in the present invention.

Embodiments of the invention will be described below with reference to accompanying drawings. First, FIG. 1 shows a wireless transmitter according to the embodiments of the invention. As shown in FIG. 1, in each of mapping circuits 110-1 to 110-n, pilot signals and shared control information are allocated to memories 110*b*-1 to 110*b*-M for respective antennas to be a block structure as described later by a selector 110*a*, and user data is distributed to the memories 110*b*-1 to 110*b*-M for respective antennas by a splitter 110*c*. Further, F/T transform circuits 111-1 to 111-M are provided for each transmission antenna, and transform the signals allocated in each of the mapping circuits 110-1 to 110-n from the signals in the frequency domain to the signals in the time domain by IFFT computation, starting with the beginning of the frame. D/A conversion circuits 112-1 to 112-M are provided for each transmission antenna, and convert the digital signals in the time domain output from F/T transform circuits 111-1 to 111-M into analog signals, respectively. Further, frequency conversion circuits 113-1 to 113-M are provided for each transmission antenna, and convert the signals output from D/A conversion circuits 112-1 to 112-M into signals with the frequency to transmit, and the signals are transmitted from transmission antennas 114-1 to 114-M, respectively.

Figure 2:
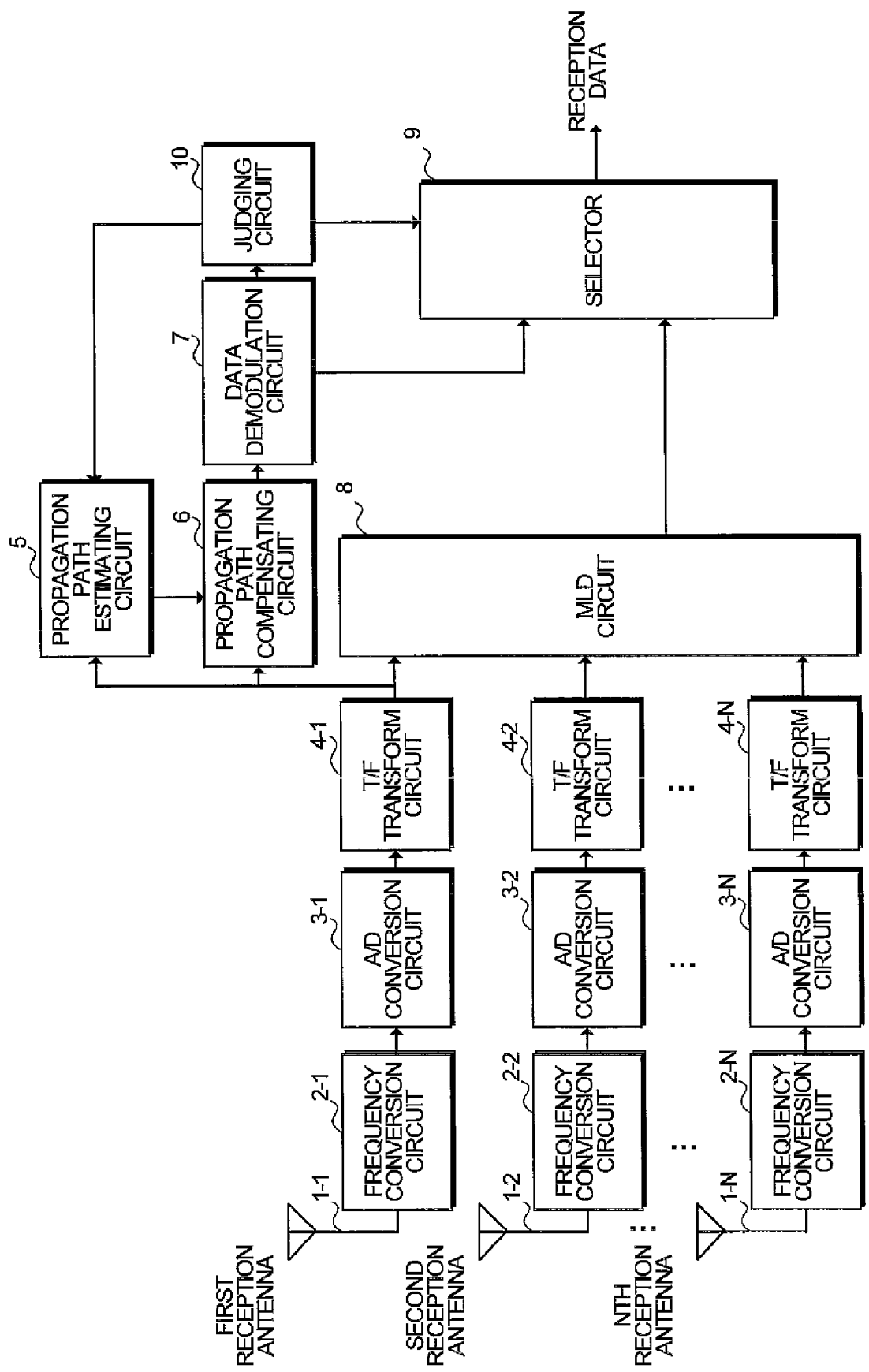
FIG. 2 is a block diagram showing a schematic configuration of a receiver according to embodiments of the invention.

Next, a wireless receiver according to the embodiments of the invention adopts a configuration as shown in FIG. 2. In other words, as shown in FIG. 2, radio signals received in a first reception antenna 1-1 to Nth reception antenna 1-N are respectively input to frequency conversion circuits 2-1 to 2-N and converted into signals with the intermediate frequency. The analog signals with the intermediate frequency converted in the frequency conversion circuits 2-1 to 2-N are converted into digital signals in A/D conversion circuits 3-1 to 3-N, respectively. Further, the digital signals in the time domain converted in the A/D conversion circuits 3-1 to 3-N are subjected to FFT processing in T/F transform circuits 4-1 to 4-N and thereby transformed into signals in the frequency domain.

A propagation path estimating circuit 5 regards a radio signal received in the first antenna 1-1 as a signal in non-MIMO, and obtains a propagation path estimation value by a method as described later. Further, a propagation path compensating circuit 6 regards the radio signal received in the first antenna 1-1 as a signal in non-MIMO, and using the estimation value calculated in the propagation path estimating circuit 5, compensates the signal transformed in the T/F transform circuit 4-1 to be a previous signal that is not varied on the propagation path. A data demodulation circuit 7 demodulates the data signal compensated in the propagation path compensating circuit 6. A judging circuit 10 controls a selector 9 based on the shared control information demodulated in the data demodulation circuit 7, and outputs an output signal from an MLD circuit 8 as reception data when the received block is MIMO, while outputting an output signal from the data demodulation circuit 7 as reception data when the received block is non-MIMO. The MLD circuit 8 regards output signals from the T/F transform circuits 4-1 to 4-N for each reception antenna as MIMO signals, and performs demodulation processing.

In addition, herein, the signal received in the first reception antenna 1-1 is used for signal input in non-MIMO, but a signal received in another reception antenna may be used, or signals received in a plurality of antennas may be combined to be used. Further, herein, for the received signal, the shared control information is demodulated in the non-MIMO demodulation circuit to switch between MIMO and non-MIMO, but the operation of an unnecessary circuit not used in demodulation may be halted according to a result of judgment on MIMO or non-MIMO in the judging circuit 10.

Hereinafter, described is the operation of the mapping circuits in non-MIMO that is common in each embodiment, and then, each embodiment describes the operation of the mapping circuits in MIMO and the propagation path estimating method of the propagation path estimating circuit of the receiver.

For example, herein, when the number of transmission antennas is four, the mapping circuits in non-MIMO in the embodiments of the invention operate as described below.

Figure 17B:
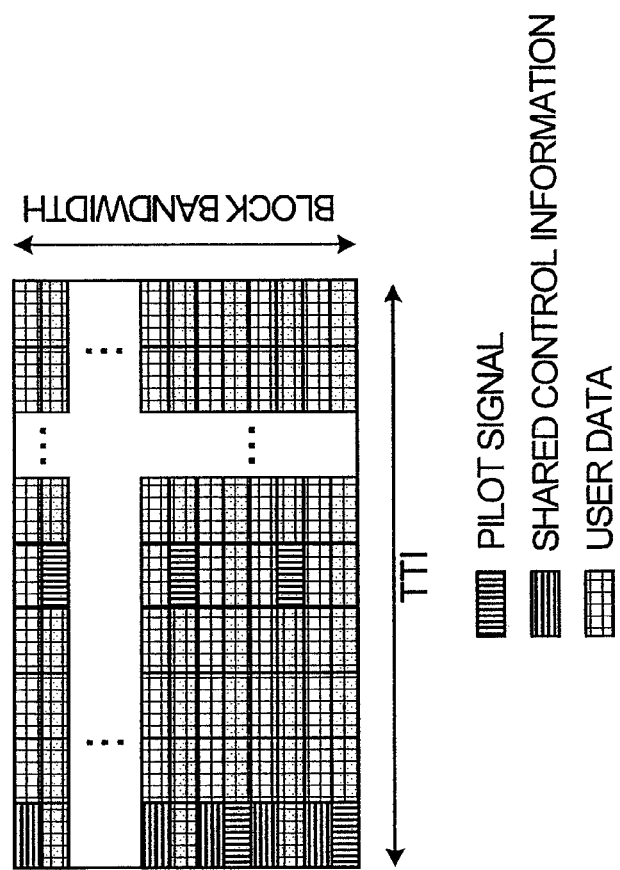
FIGS. 17A and 17B are diagrams showing a block extracted from the downlink radio frame assumed based on the proposal of 3GPP in EUTRA.
Figure 17A:
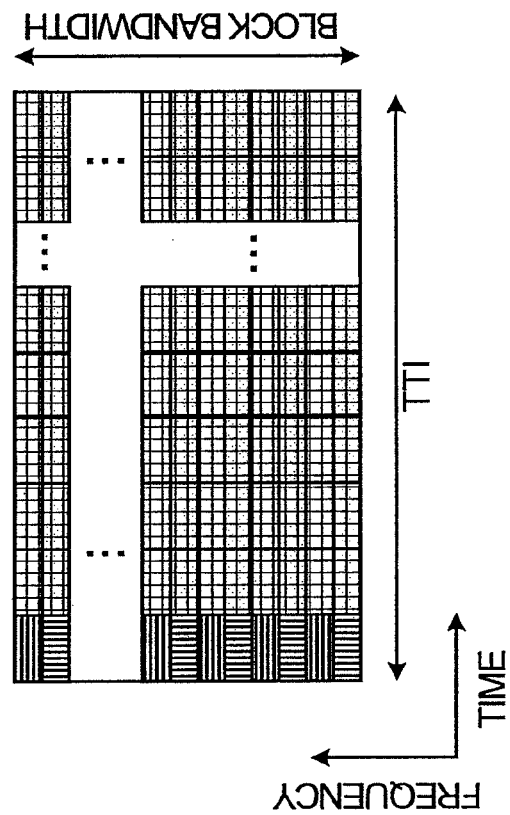
Figure 18:
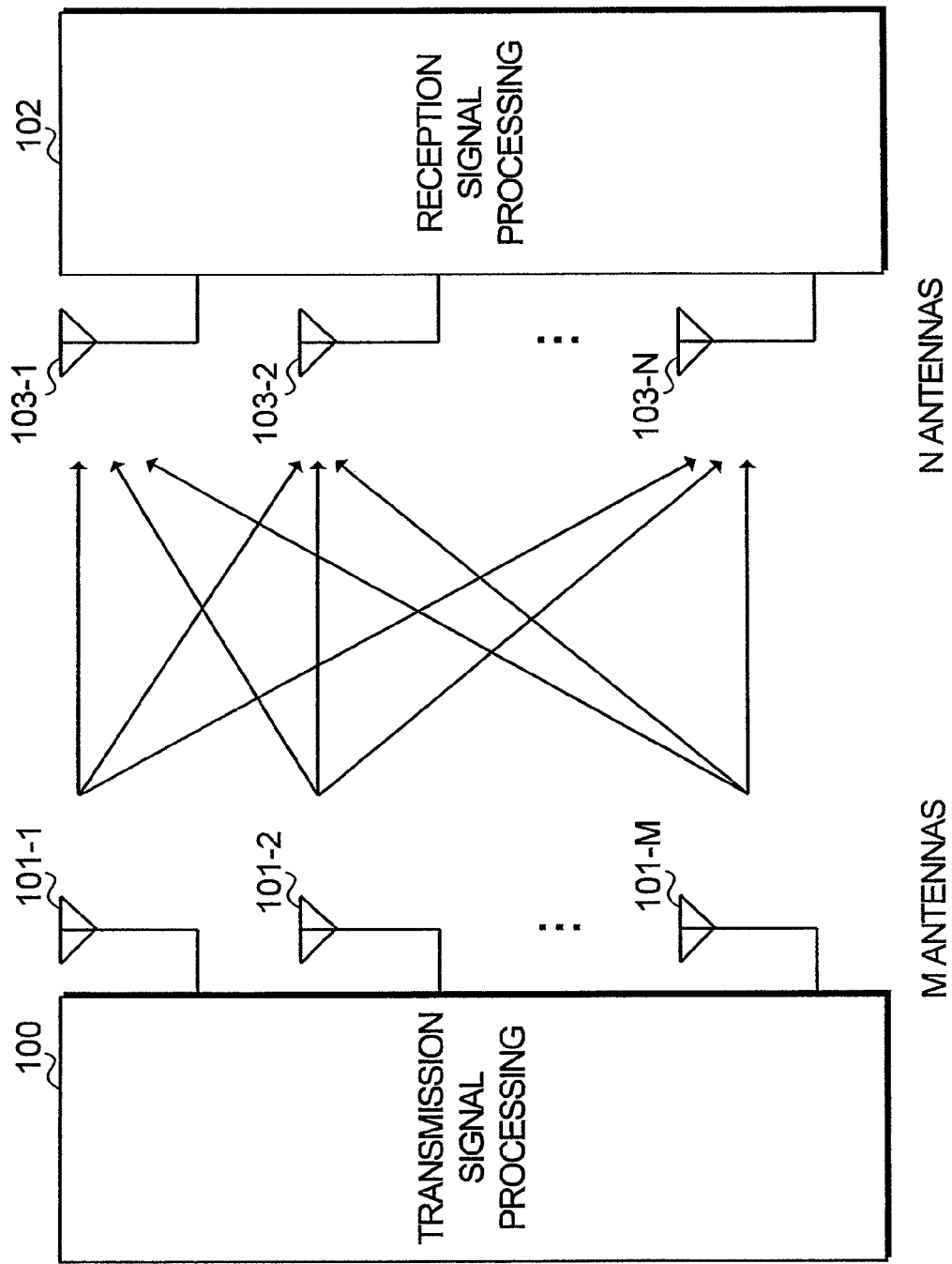
FIG. 18 is a concept diagram of a communication system using the MIMO technique.
Figure 19:
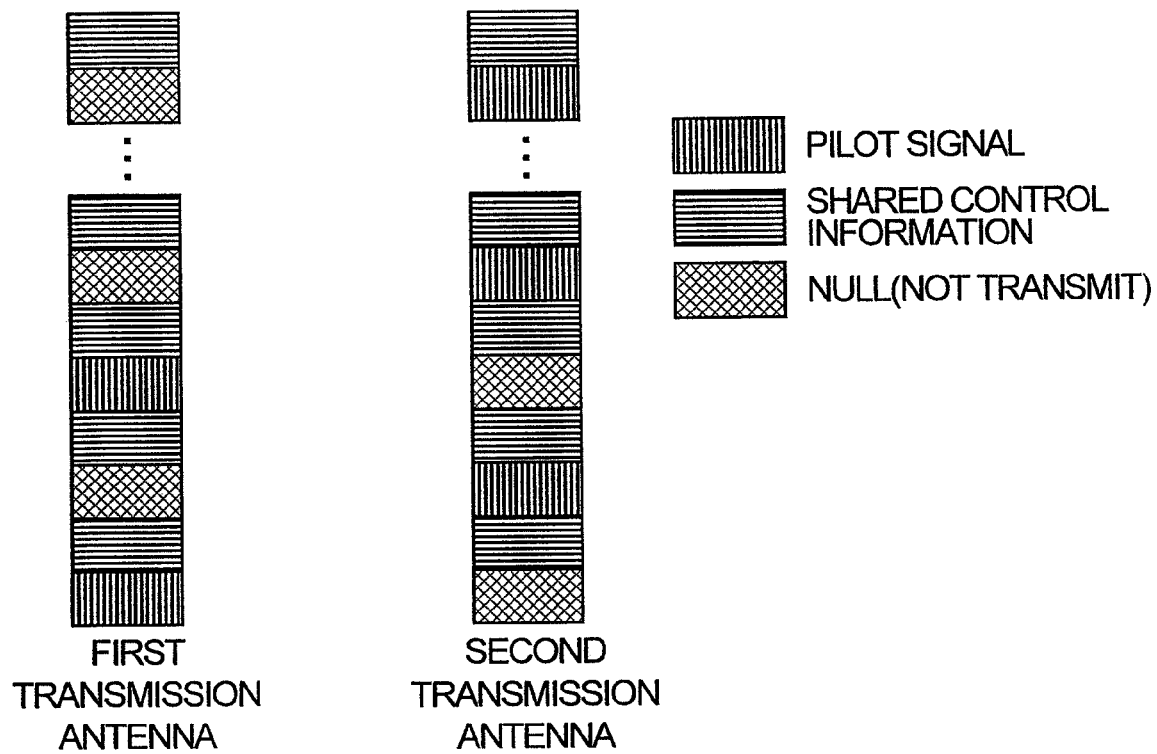
FIG. 19 is a diagram showing pilot allocation in MIMO.
Figure 20:
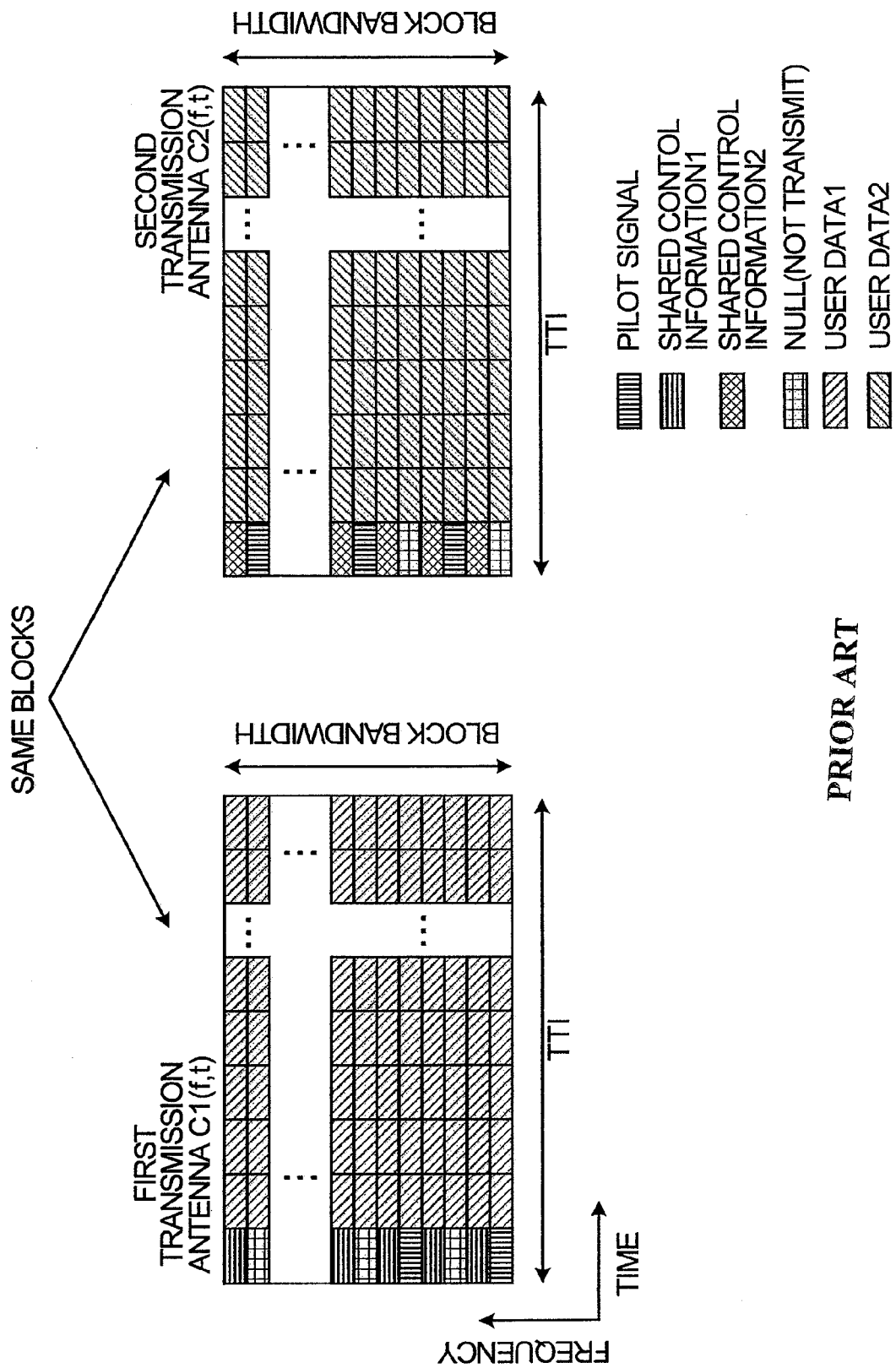
FIG. 20 is a diagram showing a configuration of one block for each antenna in using the MIMO technique.
Figure 21:
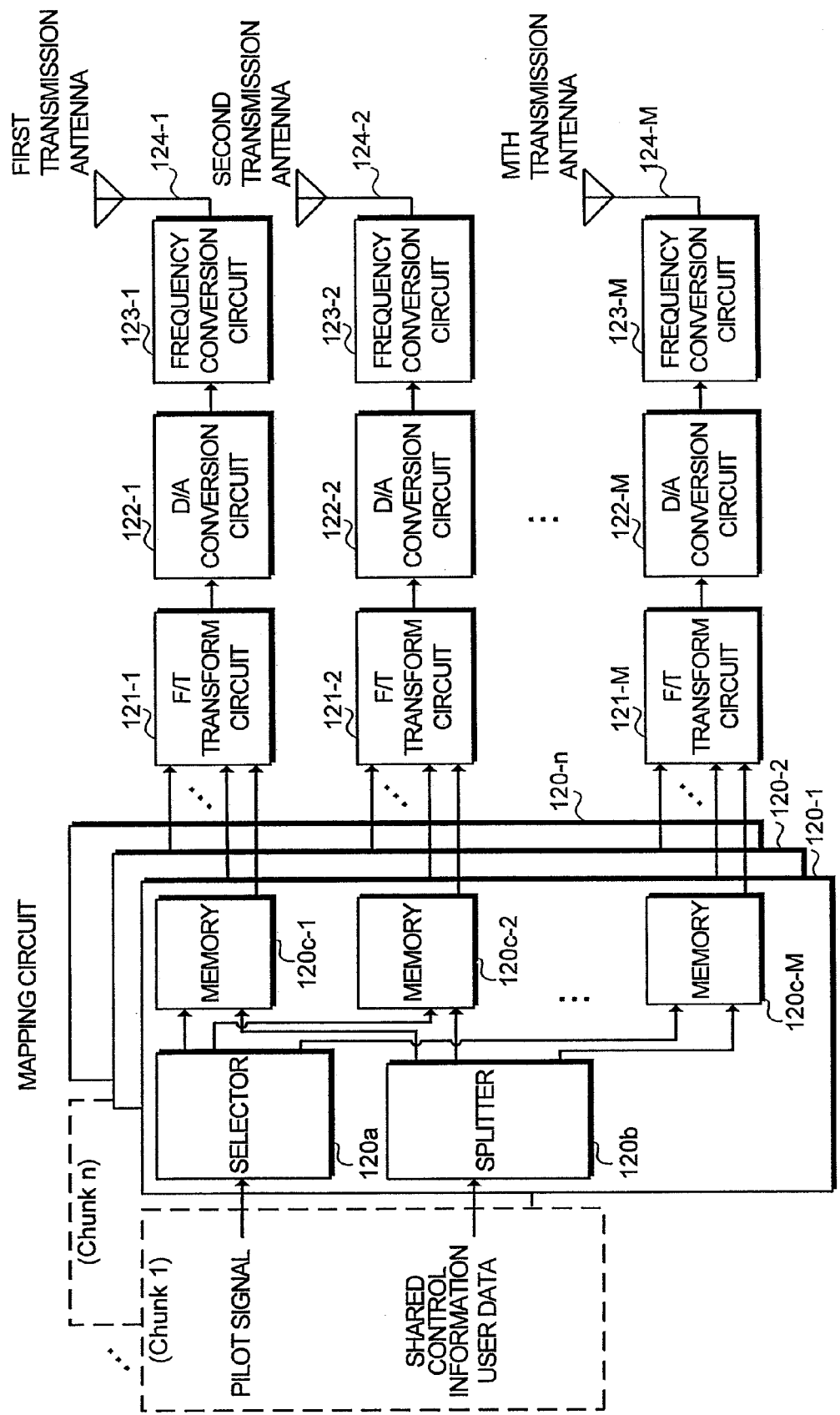
FIG. 21 is a block diagram showing a schematic configuration of a conventional transmitter.
Figure 22:
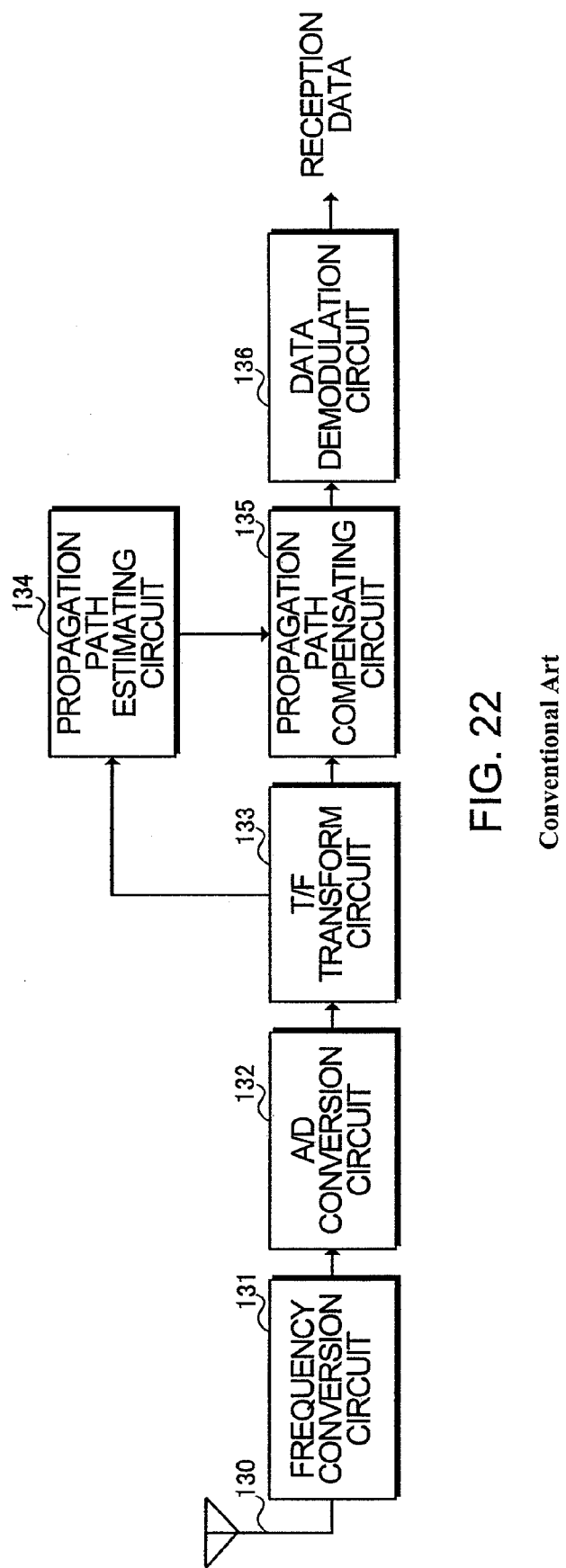
FIG. 22 is a block diagram showing a schematic configuration of a receiver.
Figure 23:
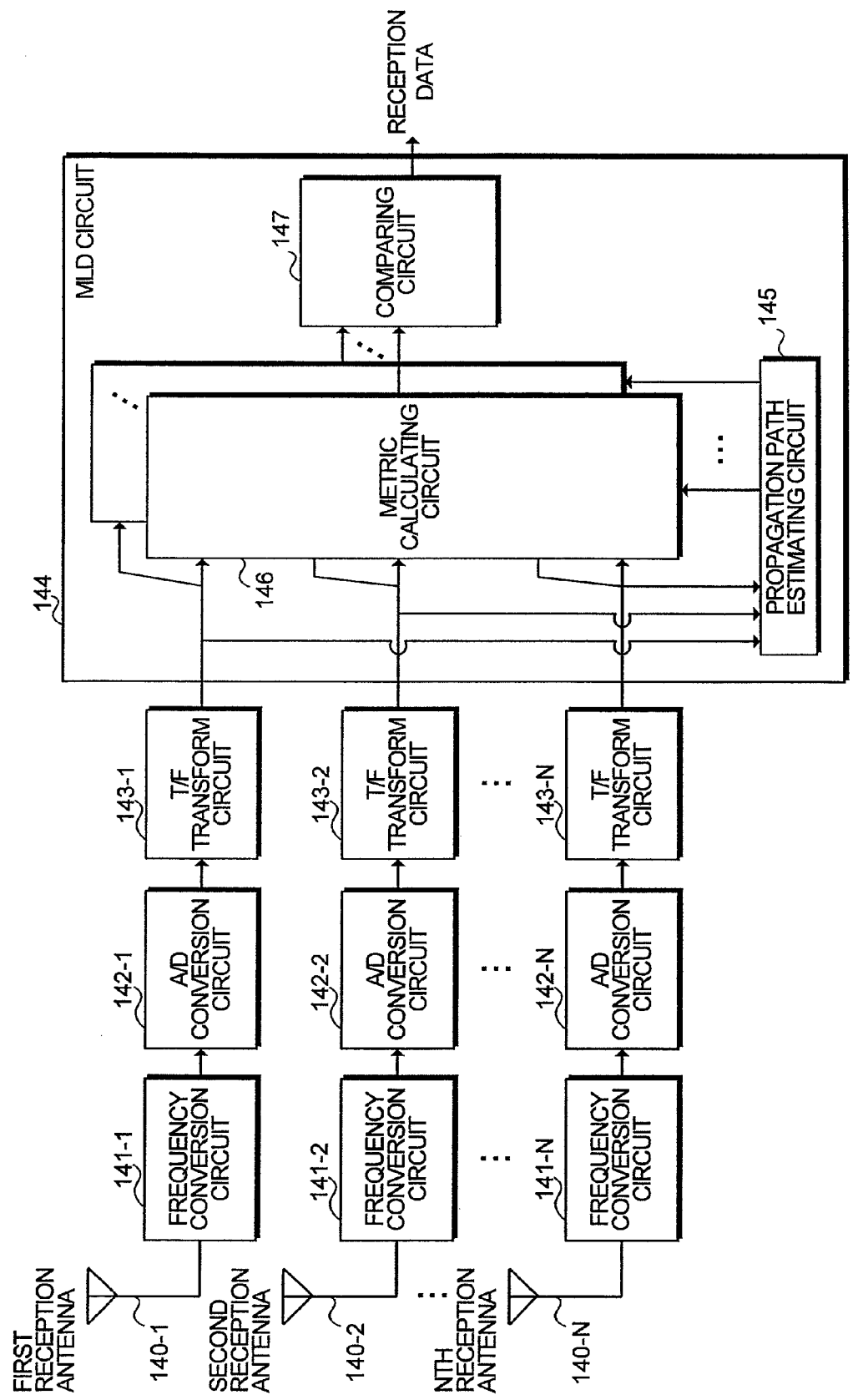
FIG. 23 is another block diagram showing a schematic configuration of a receiver.

(1) When a transmission antenna to transmit a non-MIMO signal is only the second transmission antenna 114-2, and transmission is performed in the block structure of FIG. 17A with the number of sub-channels being eight (f=8) and the number of sub-slots being six (t=6) in a block, the circuits operate so that block configurations for each transmission antenna are as shown in FIG. 3A. In other words, the second transmission antenna only transmits the pilot signal, shared control information and user data, and the other transmission antennas transmit null symbols (actually, do not transmit data).

Further, as another example, the circuits may operate as described below.

(2) When all the transmission antennas are transmission antennas to transmit non-MIMO signals, the circuits operate so that block configurations for each transmission antenna are as shown in FIG. 3B. In other words, all the transmission antennas transmit the pilot signal, shared control information and user data in the same configurations.

That is, when the shared control information, user data and pilot signals are allocated in the configuration C(f,t), block configurations of transmission antennas that transmit non-MIMO signals are all controlled to be replicas of the aforementioned configuration C(f,t), and block configurations of the other transmission antennas are controlled so that nulls are allocated.

(First Embodiment)

Described next are the mapping circuits 110-1 to 110-n in MIMO of the transmitter according to the first embodiment as shown in FIG. 1 and the propagation path estimating circuit 5 of the receiver as shown in FIG. 2, with reference to drawings. For example, the following conditions are determined herein.

(1) Two transmission antennas (M=2); and (2) Eight sub-channels (f=8) and six sub-slots (t=6) in a block.

Figures 4A, 4B:
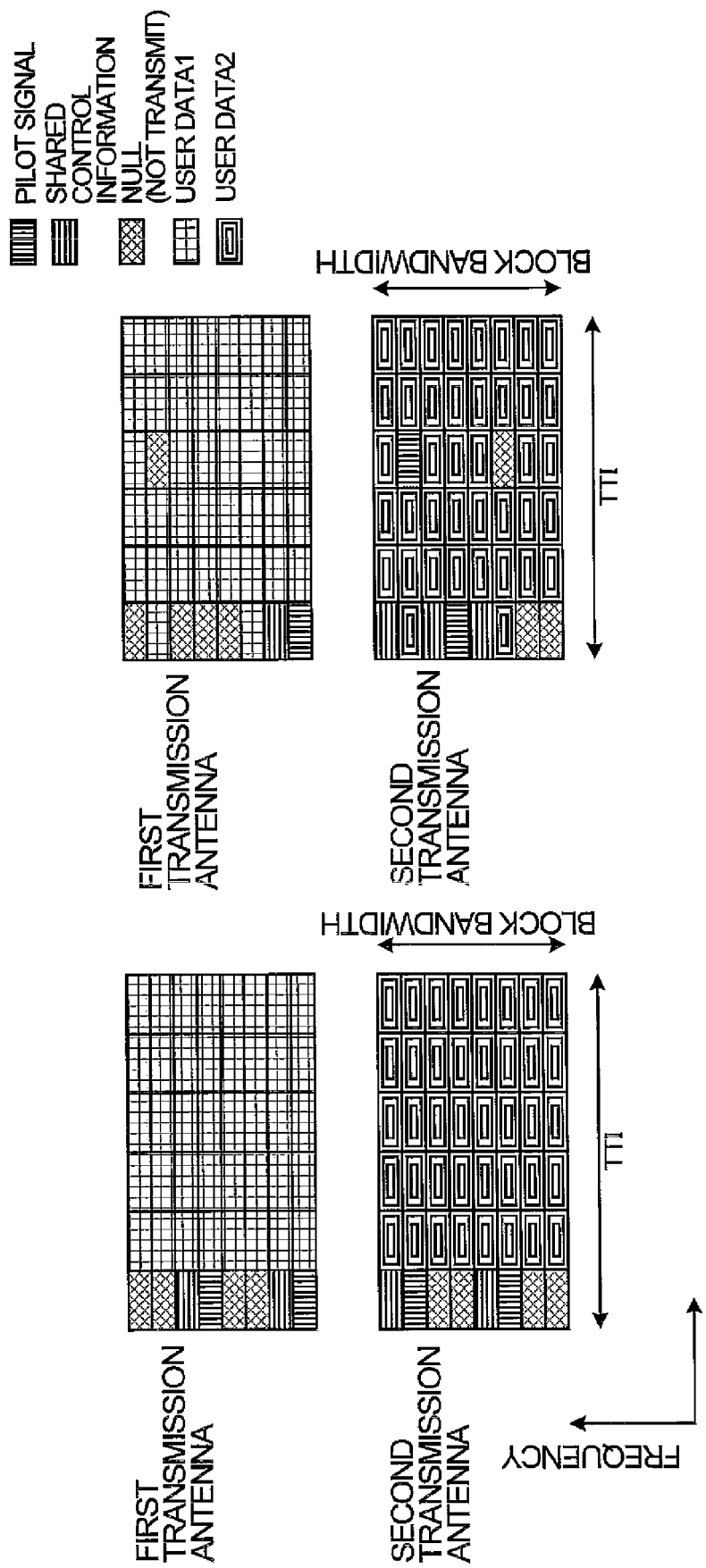
FIGS. 4A and 4B are diagrams showing block structures in the first embodiment.

On the aforementioned conditions with the block structure of FIG. 17A, the mapping circuits 110-1 to 110-n of the transmitter according to the first embodiment operate so that block configurations for each transmission antenna are as shown in FIG. 4A. Further, on the aforementioned conditions with the block structure of FIG. 17B, the mapping circuits operate so that block configurations for each transmission antenna are as shown in FIG. 4B. The operations of the mapping circuits 110-1 to 110-n will specifically be described below.

The mapping operation as shown in FIG. 4A is performed as described below.

(1) In the block structure of FIG. 17A, C(1,1), C(3,1), C(5,1) and C(7,1) are used for allocation of pilot signals. In order for the pilot signals not to overlap for each transmission antenna, pilot signals of the first transmission antenna are allocated to C1(1,1) and C1(5,1), and pilot signals of the second transmission antenna are allocated to C2(3,1) and C2(7,1). Nulls are allocated to C2(1,1), C2(5,1), C1(3,1) and C1(7,1).

(2) In the above-mentioned block structure, C(2,1), C(4,1), C(6,1) and C(8,1) are used for allocation of the shared control information. Among them, the shared control information is allocated to C1(2,1) and C1(6,1) close to the pilot signals of the first transmission antenna, and C2(4,1) and C2(8,1) close to the pilot signals of the second transmission antenna, and nulls are allocated to C2(2,1), C2(6,1), C1(4,1) and C1(8,1).

(3) User data is sequentially allocated to C1(f,t) and C2(f,t) used for allocation of the user data in the configuration of each transmission antenna.

Meanwhile, the mapping operation as shown in FIG. 4B is performed as described below.

(1) In the block structure of FIG. 17B, C(1,1), C(3,4), C(5,1) and C(7,4) are used for allocation of pilot signals. In order for the pilot signals not to overlap for each transmission antenna, pilot signals of the first transmission antenna are allocated to C1(1,1) and C1(3,4), and pilot signals of the second transmission antenna are allocated to C2(5,1) and C2(7,4). Nulls are allocated to C2(1,1) C2(3,4), C1(5,1) and C1(7,4).

(2) In the above-mentioned block structure, C(2,1) C(4,1), C(6,1) and C(8,1) are used for allocation of the shared control information. Among them, the shared control information is allocated to C1(2,1) close to the pilot signal of the first transmission antenna, and C2(4,1), C2(6,1) and C2(8, 1) close to the pilot signals of the second transmission antenna, and nulls are allocated to C2(2,1), C1(4,1), C1(6, 1) and C1(8,1).

(3) User data is sequentially allocated to C1(f,t) and C2(f,t) used for allocation of the user data in the configuration of each transmission antenna.

In other words, the mapping circuits 110-1 to 110-n according to the first embodiment are characterized by performing the operations so that:

(1) pilot signals are arranged in each configuration not to overlap for each transmission antenna because the pilot signals for each transmission antenna are required to demodulate MIMO signals;

(2) the shared control information is arranged in a configuration of the transmission antenna of the pilot signal nearest on the frequency axis, where when distances from pilot signals of a plurality of transmission antennas are the same as one another, a transmission antenna with a smaller value of f is selected; and that (3) the user data is arranged in the configuration of each transmission antenna as MIMO signals.

Described next is the propagation path estimating circuit 5 of the receiver according to the first embodiment. In the block structure as shown in FIG. 17A, the circuit 5 performs the operation as described below.

(1) Since C(1,1), C(3,1), C(5,1) and C(7,1) are pilot signals among first sub-slot C(1,1) to C(8,1) of the block transformed in the T/F transform circuit 4-1, the circuit 5 obtains a propagation path estimation value of each of the pilot signals from the difference between the phase•amplitude information of the known pilot signal and the phase•amplitude of received C(1,1), C(3,1), C(5,1) or C(7, 1).

(2) By assuming that a propagation path of a sub-channel near a pilot signal is the same as the propagation path of the pilot signal, propagation path estimation values are obtained on C(2,1), C(4,1), C(6,1) and C(8,1) in which the shared control information is arranged. Herein, when distances from a plurality of pilot signals are the same as one another, by assuming that the propagation path is the same as the propagation path of a pilot signal with a smaller value of f in C(f,1), thereby assuming that the propagation path of C(2,1) is the same as that of C(1,1), and that similarly, the propagation paths of C(4,1), C(6,1) and C(8,1) are respectively the same as those of C(3,1), C(5,1) and C(7,1), the circuit 5 obtains the propagation path estimation value of the shared control information.

In the block structure as shown in FIG. 17B, the circuit 5 performs the operation as described below.

(1) Since C(1,1) and C(5,1) are pilot signals among first sub-slot C(1,1) to C(8,1) of the block transformed in the T/F transform circuit 4-1, the circuit 5 obtains a propagation path estimation value of each of the pilot signals from the difference between the phase•amplitude information of the known pilot signal and the phase•amplitude of received C(1,1) or C(5,1).

(2) As in the case of FIG. 17A, by assuming that the propagation path of C(2,1) is the same as that of C(1,1), and that similarly, the propagation paths of C(4,1), C(6,1) and C(8, 1) are the same as that of C(5,1), the circuit 5 obtains the estimation value.

In other words, the propagation path estimating circuit 5 in the first embodiment is characterized by performing the operation of:

(1) estimating the propagation path of a sub-channel from a signal of the sub-channel in which a pilot signal is arranged and the phase•amplitude information of the known pilot signal, when first sub-slot C(f,1) of the block transformed in the T/F transform circuit 4-1 is input to the propagation path estimating circuit 5; and (2) by assuming that a propagation path of a sub-channel near a pilot signal is the same as the propagation path of the sub-channel in which the pilot signal is arranged, obtaining a propagation path estimation value of the sub-channel in which the shared control information is arranged.

Further, when the circuit 5 performs propagation path compensation of the sub-slot at the beginning of the block using the above-mentioned propagation path estimation value, and is notified that the block is a non-MIMO block from the judging circuit 10 after demodulating the shared control information, the circuit 5 may perform propagation path estimation of a user data portion by the same method as the conventional method.

As described above, by using the mapping circuits 110-1 to 110-n and the propagation path estimating circuit according to the first embodiment, when the transmitter according to the first embodiment is applied to the base station, the shared control information is transmitted as a non-MIMO signal in both the non-MIMO block and the MIMO block. In addition, in the MIMO block, the shared control information is transmitted from one specific antenna selected from among a plurality of transmission antennas by the mapping circuits 110-1 to 110-n.

Further, when the receiver according to the first embodiment is applied to the terminal, the shared control information contained in the sub-slot at the beginning of the block is demodulated as a non-MIMO signal. At this point, by using the estimation value calculated using the above-mentioned propagation path estimating circuit 5 in propagation path compensation, the terminal is capable of compensating the shared control information transmitted from the same transmission antenna as that of a pilot signal in a MIMO block using the pilot signal for each transmission antenna, while in a non-MIMO block, being capable of compensating by the same technique because the non-MIMO block is thought to be the case of one transmission antenna in a MIMO block.

Accordingly, it is possible to perform propagation path compensation without distinguishing between the non-MIMO block and MIMO block. In other words, in order to eliminate the advance information on whether a block to demodulate is MIMO or not, although such a mechanism is required that common shared control information demodulation is performed in non-MIMO and MIMO, by performing transmission and reception with the transmitter and receiver using the above-mentioned mapping circuits 110-1 to 110-n and propagation path estimating circuit 5, it is possible to eliminate the advance information on whether a block is transmitted in MIMO or non-MIMO notified prior to demodulation of the block, without modifying the block structure currently proposed by 3GPP.

Further, when the first embodiment is adopted, since pilot signals required to perform propagation path compensation of a sub-slot including the shared control information are all included in the sub-slot, the need of a buffer is eliminated for storing information of a plurality of sub-slots until pilot signals are all obtained, it is possible to early demodulate the shared control information, and the circuit scale can be reduced because a buffer is not necessary.

(Second Embodiment)

Described below are the mapping circuits 110-1 to 110-n in MIMO of the transmitter and the propagation path estimating circuit 5 of the receiver according to the second embodiment with reference to drawings. Herein, for example, following conditions are determined.

(1) Four transmission antennas (M=4); and
(2) In a block, the number of sub-channels is eight (f=8) the number of sub-slots is six (t=6), and further, when different modulation schemes are used for each antenna in MIMO, the terminal usually notifies the base station of channel reception quality information for each transmission antenna. As the reception quality herein, considered specifically are SNR (Signal to Noise Ratio), SINR (Signal to Interference and Noise Ratio), BER (Bit Error Rate) and the like.

In the second embodiment, it is assumed that the reception quality is better in the order of the first transmission antenna, the third transmission antenna, the second transmission antenna, and the fourth transmission antenna (the first transmission antenna provides the best reception quality, while the fourth transmission antenna provides the worst reception quality).

On the aforementioned conditions with the block structure of FIG. 17A, the mapping circuits 110-1 to 110-n of the transmitter used in the second embodiment operate so that block configurations for each transmission antenna are as shown in FIG. 5A. Further, on the aforementioned conditions with the block structure of FIG. 17B, the mapping circuits operate so that block configurations for each transmission antenna are as shown in FIG. 5B. The operations of the mapping circuits 110-1 to 110-n will specifically be described below.

The mapping operation as shown in FIG. 5A is performed as described below.

(1) A pilot signal of the first transmission antenna is allocated to C1(1,1), a pilot signal of the second transmission antenna is allocated to C2(3,1), a pilot signal of the third transmission antenna is allocated to C3(5,1) and a pilot signal of the fourth transmission antenna is allocated to C4(7,1). Nulls are allocated to Cm(1,1) (m=2, 3, 4), Cm(3, 1) (m=1, 3, 4), Cm(5,1) (m=1, 2, 4) and Cm(7,1) (m=1, 2, 3).
(2) In the above-mentioned block structure, C(2,1), C(4,1), C(6,1) and C(8,1) are used for allocation of the shared control information. Among the transmission antennas of the pilot signals allocated to the sub-slot including the shared control information, the same shared control information is arranged in the configuration(s) of a single or plurality of transmission antennas providing good reception quality in the terminal. Herein, pilot signals allocated to the sub-slot including the shared control information are pilot signals of the first transmission antenna, the second transmission antenna, the third transmission antenna, and the fourth transmission antenna, and by selecting two transmission antennas with good reception quality in the terminal, the same shared control information is allocated to C1(2,1) and C3(2,1), C1(4,1) and C3(4,1) C1(6,1) and C3(6,1), and C1(8,1) and C3(8,1).
(3) User data is sequentially allocated to C1(f,t), C2(f,t), C3(f,t) and C4(f,t) used for allocation of the user data in the configuration of each transmission antenna.

Meanwhile, the mapping operation as shown in FIG.5B is performed as described below.

(1) A pilot signal of the first transmission antenna is allocated to C1(1,1), a pilot signal of the second transmission antenna is allocated to C2(5,1), a pilot signal of the third transmission antenna is allocated to C3(3,4) and a pilot signal of the fourth transmission antenna is allocated to C4(7,4). Nulls are allocated to Cm(1,1)(m=2,3,4), Cm(5, 1)(m=1,3,4), Cm(3,4)(m=1,2,4) and Cm(7,4)(m=1,2,3).
(2) In the above-mentioned block structure, C(2,1), C(4,1), C(6,1) and C(8,1) are used for allocation of the shared control information. Among the transmission antennas of the pilot signals allocated to the sub-slot including the shared control information, the same shared control information is arranged in the configuration(s) of a single or plurality of transmission antennas providing good reception quality in the terminal. Herein, pilot signals allocated to the sub-slot including the shared control information are pilot signals of the first transmission antenna and the second transmission antenna, and by selecting two transmission antennas with good reception quality in the terminal, the same shared control information is allocated to C1(2,1) and C2(2,1), C1(4,1) and C2(4,1), C1(6,1) and C2(6,1), and C1(8,1) and C2(8,1).
(3) User data is sequentially allocated to C1(f,t), C2(f,t), C3(f,t) and C4(f,t) used for allocation of the user data in the configuration of each transmission antenna.

In other words, the mapping circuits 110-1 to 110-n according to the second embodiment are characterized by performing the operations so that:
(1) pilot signals are arranged in each configuration not to overlap for each transmission antenna as in the first embodiment;
(2) the shared control information is arranged in a configuration of each transmission antenna so that the same shared control information is transmitted from a single or plurality of transmission antennas (the number of selected transmission antennas is known in the base station and terminal) providing good reception quality in the terminal among transmission antennas of pilot signals transmitted in the sub-slot including the shared control information; and that
(3) the user data is arranged in the configuration of each transmission antenna as MIMO signals.

Described next is the propagation path estimating circuit 5 of the receiver according to the second embodiment. In the block structure as shown in FIG. 17A, the circuit 5 performs the operation as described below.

(1) Since C(1,1), C(3,1), C(5,1) and C(7,1) are pilot signals among first sub-slot C(1,1) to C(8,1) of the block transformed in the T/F transform circuit 4-1, the circuit 5 obtains a propagation path estimation value of each of the pilot signals from the difference between the phase•amplitude information of the known pilot signal and the phase•amplitude of received C(1,1), C(3,1), C(5,1) or C(7, 1).
(2) The shared control information is transmitted from two transmission antennas with good reception quality notified to the base station in MIMO. Accordingly, the circuit 5 obtains respective propagation path estimation values of the shared control information of the selected transmission antennas, combines the obtained estimation values, and thereby obtains the propagation path estimation value of the received shared control information. Herein, first, using the pilot signal of C(1,1) allocated to the first transmission antenna, the circuit 5 obtains propagation path estimation values of C(2,1), C(4,1), C(6,1) and C(8,1). Next, using the pilot signal of C(5,1) allocated to the third transmission antenna, propagation path estimation values are similarly obtained. The circuit 5 combines the estimation values of C(2,1) respectively obtained in two transmission antennas, and thereby obtains a propagation path estimation value of received signal C(2,1). Similarly, the circuit 5 obtains propagation path estimation values of C(4,1), C(6,1) and C(8,1) by combining. The same methods as conventional methods (average, linear interpolation) can be used as the method of obtaining an estimation value for each transmission antenna.

Meanwhile, in the block structure as shown in FIG. 17B, the circuit 5 performs the operation as described below.

(1) Since C(1,1) and C(5,1) are pilot signals among first sub-slot C(1,1) to C(8,1) of the block transformed in the T/F transform circuit 4-1, the circuit 5 obtains a propagation path estimation value of each of the pilot signals from the difference between the phase•amplitude information of the known pilot signal and the phase•amplitude of received C(1,1) or C(5,1).

(2) The circuit 5 obtains the propagation path estimation value as in (2) of the block of the above-mentioned (a). Herein, using the pilot signal of C(1,1) allocated to the first transmission antenna, the circuit 5 obtains propagation path estimation values of C1(2,1), C1(4,1), C1(6,1) and C1(8,1). Using the pilot signal of C(5,1) allocated to the second transmission antenna, the circuit 5 obtains propagation path estimation values of C2(2,1), C2(4,1), C2(6,1) and C2(8,1). The circuit 5 combines the obtained estimation values of C1(2,1) and C2(2,1), and thereby obtains a propagation path estimation value of received C(2,1). Similarly, the circuit 5 obtains propagation path estimation values of C(4,1), C(6,1) and C(8,1). The same methods as conventional methods (average, linear interpolation) can be used as the method of obtaining an estimation value for each transmission antenna.

In other words, the propagation path estimating circuit 5 according to the second embodiment is characterized by performing the operation of:

(1) estimating the propagation path of a sub-channel from differences in phase and amplitude between received signal of the sub-channel in which a pilot signal is arranged and the known pilot signal, when first sub-slot C(f,1) of the block transformed in the T/F transform circuit 4-1 is input to the propagation path estimating circuit 5; and (2) since the shared control information is transmitted from a single or plurality of transmission antennas with good reception quality notified to the base station, obtaining propagation path estimation values of the shared control information for each of the selected transmission antenna, combining the obtained estimation values, and thereby obtaining the propagation path estimation value of the received shared control information.

Further, when the circuit 5 performs propagation path compensation of the sub-slot at the beginning of the block using the above-mentioned propagation path estimation value, and is notified that the block is a non-MIMO block from the judging circuit 10 after demodulating the shared control information, the circuit 5 may perform propagation path estimation of a user data portion by the same method as the conventional method.

As described above, by using the mapping circuits 110-1 to 110-n and the propagation path estimating circuit 5 according to the second embodiment, when the transmitter according to the second embodiment is applied to the base station, the shared control information is transmitted as a non-MIMO signal in both the non-MIMO block and the MIMO block. In addition, in the MIMO block, for the shared control information, the same shared control information is transmitted from all the transmission antennas of pilot signals transmitted in a sub-slot including the shared control information.

Further, when the receiver according to the second embodiment is applied to the terminal, the shared control information contained in the sub-slot at the beginning of the block is demodulated as a non-MIMO signal. At this point, by using the estimation value calculated using the above-mentioned propagation path estimating circuit 5 in propagation path compensation, the terminal is capable of compensating the shared control information for the propagation path in a MIMO-block by using pilot signals for each of the selected transmission antennas, obtaining variations in phase and amplitude of each of the transmission antennas and combining the values, and also in a non-MIMO block, capable of compensating for the propagation path by the same technique as that used in the case of the MIMO-block.

Accordingly, it is possible to perform propagation path compensation of the shared control information without distinguishing between the non-MIMO block and MIMO block. In other words, as in the first embodiment, by performing transmission and reception with the transmitter and receiver using the above-mentioned mapping circuits 110-1 to 110-n and propagation path estimating circuit 5 according to the second embodiment, it is possible to eliminate the advance information on whether a block is transmitted in MIMO or non-MIMO notified prior to demodulation of the block, without modifying the block structure currently proposed by 3GPP. Further, it is possible to early demodulate the shared control information, and the circuit scale can be reduced because a buffer is not necessary. Furthermore, since the shared control information is transmitted using a transmission antenna with good reception quality, it is possible to enhance the signal quality of the shared control information. In addition, herein, the transmission antenna of the shared control information is selected based on the channel reception quality information from the terminal, but it is also possible to use a transmission antenna that is beforehand determined between the base station and the terminal.

(Third Embodiment)

Described next are the mapping circuits 110-1 to 110-n in MIMO of the transmitter and the propagation path estimating circuit 5 of the receiver according to the third embodiment of the invention, with reference to drawings. Also herein, for example, the following conditions are determined as in the first embodiment.

(1) Two transmission antennas (M=2); and
(2) Eight sub-channels (f=8) and six sub-slots (t=6) in a block.

On the aforementioned conditions with the block structure of FIG. 17A, the mapping circuits 110-1 to 110-n of the transmitter according to the third embodiment operate so that block configurations for each antenna are as shown in FIG. 6A. Further, on the aforementioned conditions with the block structure of FIG. 17B, the mapping circuits operate so that block configurations for each antenna are as shown in FIG. 6B. The operations of the mapping circuits 110-1 to 110-n will specifically be described.

The mapping operation as shown in FIG. 6A is performed as described below.

(1) As in the first embodiment, pilot signals of the first transmission antenna are allocated to C1(1,1) and C1(5,1), and pilot signals of the second transmission antenna are allocated to C2(3,1) and C2(7,1). Nulls are allocated to C2(1, 1), C2(5,1), C1(3,1) and C1(7,1).

(2) In the above-mentioned block structure, C(2,1), C(4,1) C(6,1) and C(8,1) are used for allocation of the shared control information, and by using the first transmission antenna as an antenna that is beforehand determined between the base station and the terminal to allocate the shared control information, the shared control information is allocated to C1(2,1), C1(4,1), C1(6,1) and C1(8,1), while nulls are allocated to C2(2,1), C2(4,1), C2(6,1) and C2(8, 1).

(3) User data is sequentially allocated to $C1(f,t)$ and $C2(f,t)$ used for allocation of the user data in the configuration of each transmission antenna.

Meanwhile, the mapping operation as shown in FIG. 6B is performed as described below.

(1) As in the first embodiment, pilot signals of the first transmission antenna are allocated to CC(1,1) and C1(3,4), and pilot signals of the second transmission antenna are allocated to C2(5,1) and C2(7,4). Nulls are allocated to C2(1, 1), C2(3,4), C1(5,1) and C1(7,4).

(2) As in FIG. 6A, the shared control information is allocated to C1(2,1), C1(4,1), C1(6,1) and C1(8,1), and nulls are allocated to C2(2,1), C2(4,1), C2(6,1) and C2(8,1).

(3) User data is sequentially allocated to $C1(f,t)$ and $C2(f,t)$ used for allocation of the user data in the configuration of each transmission antenna.

In other words, the mapping circuits 110-1 to 110-n according to the third embodiment are characterized by performing the operations so that:

(1) pilot signals are arranged in each configuration not to overlap for each transmission antenna as in the first embodiment;

(2) the shared control information is arranged in a configuration of the transmission antenna that is beforehand determined between the base station and the terminal by any means; and that (3) the user data is arranged in the configuration of each transmission antenna as MIMO signals.

Described next is the propagation path estimating circuit 5 of the receiver according to the third embodiment. In the block structure as shown in FIG. 17A, the circuit 5 performs the operation as described below.

(1) Since C(1,1), C(3,1), C(5,1) and C(7,1) are pilot signals among first sub-slot C(1,1) to C(8,1) of the block transformed in the T/F transform circuit 4-1, the circuit 5 obtains a propagation path estimation value of each of the pilot signals from the difference between the phase•amplitude information of the known pilot signal and the phase•amplitude of received C(1,1), C(3,1), C(5,1) or C(7, 1).

(2) The propagation path estimation value of the shared control information is obtained using the propagation path estimation value of the pilot signal of the beforehand determined transmission antenna. Herein, using only the pilot signals of C(1,1) and C(5,1) allocated to the first transmission antenna, the circuit 5 obtains propagation path estimation values of C(2,1), C(4,1), C(6,1) and C(8,1) in which the shared control information is arranged. The same methods as conventional methods (average, linear interpolation) can be used as the method of obtaining an estimation value.

Meanwhile, in the block structure as shown in FIG. 17B, the circuit 5 performs the operation as described below.

(1) Since C(1,1) and C(5,1) are pilot signals among first sub-slot C(1,1) to C(8,1) of the block transformed in the T/F transform circuit 4-1, the circuit 5 obtains a propagation path estimation value of each of the pilot signals from the difference between the phase•amplitude information of the known pilot signal and the phase•amplitude of received C(1,1) or C(5,1).

(2) The propagation path estimation value of the shared control information is obtained using the propagation path estimation value of the pilot signal of the beforehand determined transmission antenna. Herein, using only the pilot signal of C(1,1) allocated to the first transmission antenna, the circuit 5 obtains propagation path estimation values of C(2,1), C(4,1), C(6,1) and C(8,1) in which the shared control information is arranged. The same methods as conventional methods (average, linear interpolation) can be used as the method of obtaining an estimation value.

In other words, the propagation path estimating circuit 5 in the third embodiment is characterized by performing the operation of:

(1) estimating the propagation path of a sub-channel from differences in phase and amplitude between a received signal of the sub-channel in which a pilot signal is arranged and the known pilot signal, when first sub-slot $C(f,1)$ of the block transformed in the T/F transform circuit 4-1 is input to the propagation path estimating circuit 5; and (2) by using only pilot signals in a configuration where the pilot signals of a beforehand determined transmission antenna are arranged in MIMO, obtaining propagation path estimation values of sub-channels in which the shared control information is arranged.

Further, when the circuit 5 performs propagation path compensation of the sub-slot at the beginning of the block using the above-mentioned propagation path estimation value, and is notified that the block is a non-MIMO block from the judging circuit 10 after demodulating the shared control information, the circuit 5 may perform propagation path estimation of a user data portion by the same method as the conventional method.

By using the mapping circuits 110-1 to 110-n and the propagation path estimating circuit 5 according to the third embodiment, when the transmitter according to the third embodiment is applied to the base station, the shared control information is transmitted as a non-MIMO signal in both the non-MIMO block and the MIMO block. In addition, in the MIMO block, the shared control information is transmitted from one specific antenna selected from a plurality of transmission antennas by the mapping circuits 110-1 to 110-n.

Further, when the receiver according to the third embodiment is applied to the terminal, the shared control information contained in the sub-slot at the beginning of the block is demodulated as a non-MIMO signal. At this point, by using the estimation value calculated using the above-mentioned propagation path estimating circuit 5 in propagation path compensation, the terminal is capable of compensating for the propagation path in a MIMO block by using pilot signals of an antenna that transmits the shared control information, and in a non-MIMO block, capable of estimating the propagation path using only the pilot signals used in the MIMO-block, while originally being capable of estimating the propagation path using all the pilot signals.

Accordingly, it is possible to perform propagation path compensation without distinguishing between the non-MIMO block and MIMO block. In other words, as in the first embodiment, by performing transmission and reception with the transmitter and receiver using the above-mentioned mapping circuits 110-1 to 110-n and propagation path estimating circuit 5 according to the third embodiment, it is possible to eliminate the advance information on whether a block is transmitted in MIMO or non-MIMO notified prior to demodulation of the block, without modifying the block structure currently proposed by 3GPP. Further, it is possible to early demodulate the shared control information, and the circuit scale can be reduced because a buffer is not necessary.

(Fourth Embodiment)

Described below are the mapping circuits 110-1 to 110-n in MIMO of the transmitter and the propagation path estimating circuit 5 of the receiver according to the fourth embodiment of the invention, with reference to drawings. Also herein, for example, the following conditions are determined as in the third embodiment.

(1) Two transmission antennas (M=2); and
(2) Eight sub-channels (f=8) and six sub-slots (t=6) in a block.

Figure 7B:
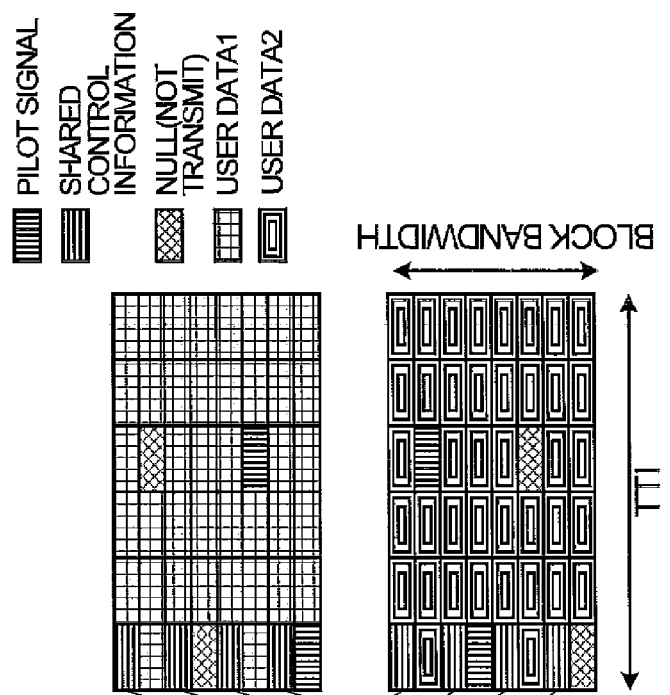
FIGS. 7A and 7B are diagrams showing block structures in the fourth embodiment.
Figure 7A:
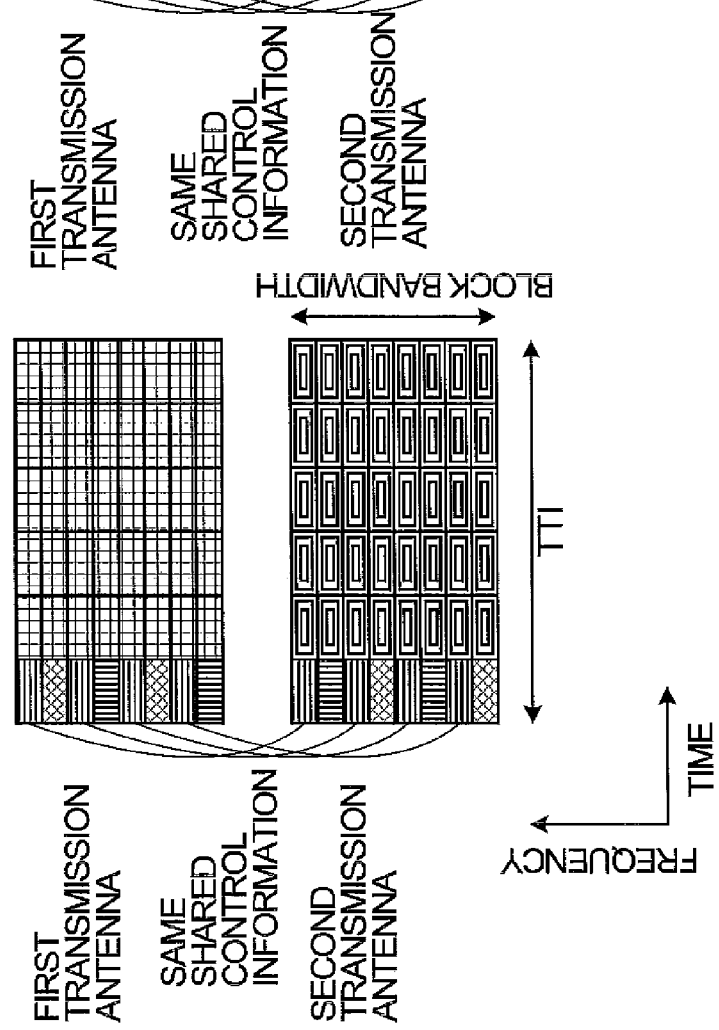

On the aforementioned conditions with the block structure of FIG. 17A, the mapping circuits 110-1 to 110-n of the transmitter according to the fourth embodiment operate so that block configurations for each transmission antenna are as shown in FIG. 7A. Further, on the aforementioned conditions with the block structure of FIG. 17B, the mapping circuits operate so that block configurations for each transmission antenna are as shown in FIG. 7B. The operations of the mapping circuits 110-1 to 110-n will specifically be described below.

The mapping operation as shown in FIG. 7A is performed as described below.

(1) As in the third embodiment, pilot signals of the first transmission antenna are allocated to C1(1,1) and C1(5,1), and pilot signals of the second transmission antenna are allocated to C2(3,1) and C2(7,1). Nulls are allocated to C2(1,1), C2(5,1), C1(3,1) and C1(7,1).
(2) In the above-mentioned block structure, C(2,1), C(4,1), C(6,1) and C(8,1) are used for allocation of the shared control information. The same shared control information is arranged in all the configurations of transmission antennas of the pilot signals allocated to a sub-slot including the shared control information. Herein, since pilot signals allocated to the sub-slot including the shared control information are pilot signals of the first transmission antenna and the second transmission antenna, the same shared control information is allocated to C1(2,1) and C2(2,1), C1(4,1) and C2(4,1), C1(6,1) and C2(6,1), and C1(8,1) and C2(8,1).
(3) User data is sequentially allocated to C1(f,t), and C2(f,t) used for allocation of the user data in the configuration of each transmission antenna.

Meanwhile, the mapping operation as shown in FIG. 7B is performed as described below.

(1) As in the third embodiment, pilot signals of the first transmission antenna are allocated to C1(1,1) and C1(3,4), and pilot signals of the second transmission antenna are allocated to C2(5,1) and C2(7,4). Nulls are allocated to C2(1,1), C2(3,4), C1(5,1) and C1(7,4).
(2) As in FIG. 7A, the same shared control information is allocated to C1(2,1) and C2(2,1), C1(4,1) and C2(4,1), C1(6,1) and C2(6,1), and C1(8,1) and C2(8,1).
(3) User data is sequentially allocated to C1(f,t), and C2(f,t) used for allocation of the user data in the configuration of each transmission antenna.

In other words, the mapping circuits 110-1 to 110-n according to the fourth embodiment are characterized by performing the operations so that:

(1) pilot signals are arranged in each configuration not to overlap for each transmission antenna as in the first embodiment;
(2) the shared control information is arranged in a configuration of each transmission antenna so that the same shared control information is transmitted from all the transmission antennas of pilot signals transmitted in the sub-slot including the shared control information; and that
(3) the user data is arranged in the configuration of each transmission antenna as MIMO signals.

Described next is the propagation path estimating circuit 5 of the receiver according to the fourth embodiment. In the block structure as shown in FIG. 17A, the circuit 5 performs the operation as described below.

(1) Since C(1,1), C(3,1), C(5,1) and C(7,1) are pilot signals among first sub-slot C(1,1) to C(8,1) of the block transformed in the T/F transform circuit 4-1, the circuit 5 obtains a propagation path estimation value of each of the pilot signals from the difference between the phase•amplitude information of the known pilot signal and the phase•amplitude of received C(1,1), C(3,1), C(5,1) or C(7,1).
(2) The propagation path estimation value of the shared control information is considered a combined value of propagation path estimation values for each transmission antenna arranged by the above-mentioned mapping circuits 110-1 to 110-n . Accordingly, the circuit 5 obtains propagation path estimation values of the shared control information for each transmission antenna, combines the obtained estimation values, and thereby obtains the propagation path estimation value of the received shared control information. Herein, first, using the pilot signals of C(1,1) and C(5,1) allocated to the first transmission antenna, the circuit 5 obtains propagation path estimation values of C(2,1), C(4,1), C(6,1) and C(8,1). Next, using the pilot signals of C(3,1) and C(7,1) allocated to the second transmission antenna, propagation path estimation values are similarly obtained. The circuit 5 combines the estimation values of C(2,1) respectively obtained in two transmission antennas, and thereby obtains a propagation path estimation value of received C(2,1). Similarly, the circuit 5 obtains propagation path estimation values of C(4,1), C(6,1) and C(8,1) by combining. The same methods as conventional methods (average, linear interpolation) can be used as the method of obtaining an estimation value for each transmission antenna.

Meanwhile, in the block structure as shown in FIG. 17B, the circuit 5 performs the operation as described below.

(1) Since C(1,1) and C(5,1) are pilot signals among first sub-slot C(1,1) to C(8,1) of the block transformed in the T/F transform circuit 4-1, the circuit 5 obtains a propagation path estimation value of each of the pilot signals from the difference between the phase•amplitude information of the known pilot signal and the phase•amplitude of received C(1,1) or C(5,1).
(2) The propagation path estimation value of the shared control information is considered a combined value of propagation path estimation values for each transmission antenna arranged by the above-mentioned mapping circuits 110-1 to 110-n. Accordingly, the circuit 5 obtains propagation path estimation values of the shared control information for each antenna, combines the obtained estimation values, and thereby obtains the propagation path estimation value of the received shared control information. Herein, using the pilot signal of C(1,1) allocated to the first transmission antenna, the circuit 5 obtains propagation path estimation values of C1(2,1), C1(4,1), C1(6,1) and C1(8,1), and using the pilot signal of C(5,1) allocated to the second transmission antenna, obtains propagation path estimation values of C2(2,1), C2(4,1), C2(6,1) and C2(8, 1). The circuit 5 combines the estimation values of obtained C1(2,1) and C2(2,1), and thereby obtains an estimation value of received C(2,1). Similarly, the circuit 5 obtains propagation path estimation values of C(4,1), C(6,1) and C(8,1). The same methods as conventional methods (average, linear interpolation) can be used as the method of obtaining an estimation value for each transmission antenna.

In other words, the propagation path estimating circuit 5 according to the fourth embodiment is characterized by performing the operation of:
(1) estimating the propagation path of a sub-channel from differences in phase and amplitude between received signal of the sub-channel in which a pilot signal is arranged and the known pilot signal, when first sub-slot C(f,1) of the block transformed in the T/F transform circuit 4-1 is input to the propagation path estimating circuit 5; and
(2) since the propagation path estimation value of the shared control information is considered a combined value of propagation path estimation values for each transmission antenna arranged by the above-mentioned mapping circuits 110-1 to 110-n, obtaining propagation path estimation values of the shared control information for each transmission antenna, combining the obtained estimation values, and thereby obtaining the propagation path estimation value of the received shared control information.

Further, when the circuit 5 performs propagation path compensation of the sub-slot at the beginning of the block using the above-mentioned propagation path estimation value, and is notified that the block is a non-MIMO block from the judging circuit 10 after demodulating the shared control information, the circuit 5 may perform propagation path estimation of a user data portion by the same method as the conventional method.

By using the mapping circuits 110-1 to 110-n and the propagation path estimating circuit 5 according to the fourth embodiment, when the transmitter according to the fourth embodiment is applied to the base station, the shared control information is transmitted as a non-MIMO signal in both the non-MIMO block and the MIMO block. In addition, in the MIMO block, for the shared control information, the same shared control information is transmitted from all the transmission antennas of pilot signals transmitted in a sub-slot including the shared control information.

Further, when the receiver according to the fourth embodiment is applied to the terminal, the shared control information contained in the sub-slot at the beginning of the block is demodulated as a non-MIMO signal. At this point, by using the estimation value calculated using the above-mentioned propagation path estimating circuit 5 in propagation path compensation, the terminal is capable of compensating the shared control information for the propagation path in a MIMO-block by using pilot signals for each antenna, obtaining variations in phase and amplitude of each antenna and combining the values, and also in a non-MIMO block, capable of compensating for the propagation path by the same technique as that used in the case of the MIMO-block.

Accordingly, it is possible to perform propagation path compensation without distinguishing between the non-MIMO block and MIMO block. In other words, as in the first embodiment, by performing transmission and reception with the transmitter and receiver using the above-mentioned mapping circuits 110-1 to 110-n and propagation path estimating circuit 5 according to the fourth embodiment, it is possible to eliminate the advance information on whether a block is transmitted in MIMO or non-MIMO notified prior to demodulation of the block, without modifying the block structure currently proposed by 3GPP. Further, it is possible to early demodulate the shared control information, and the circuit scale can be reduced because a buffer is not necessary.

(Fifth Embodiment)

Described below are the mapping circuits 110-1 to 110-n in MIMO of the transmitter and the propagation path estimating circuit 5 of the receiver according to the fifth embodiment, with reference to drawings. For example, the following conditions are determined herein.
(1) Two transmission antennas (M=2); and
(2) Eight sub-channels (f=8) and six sub-slots (t=6) in a block.

Figures 8A, 8B:
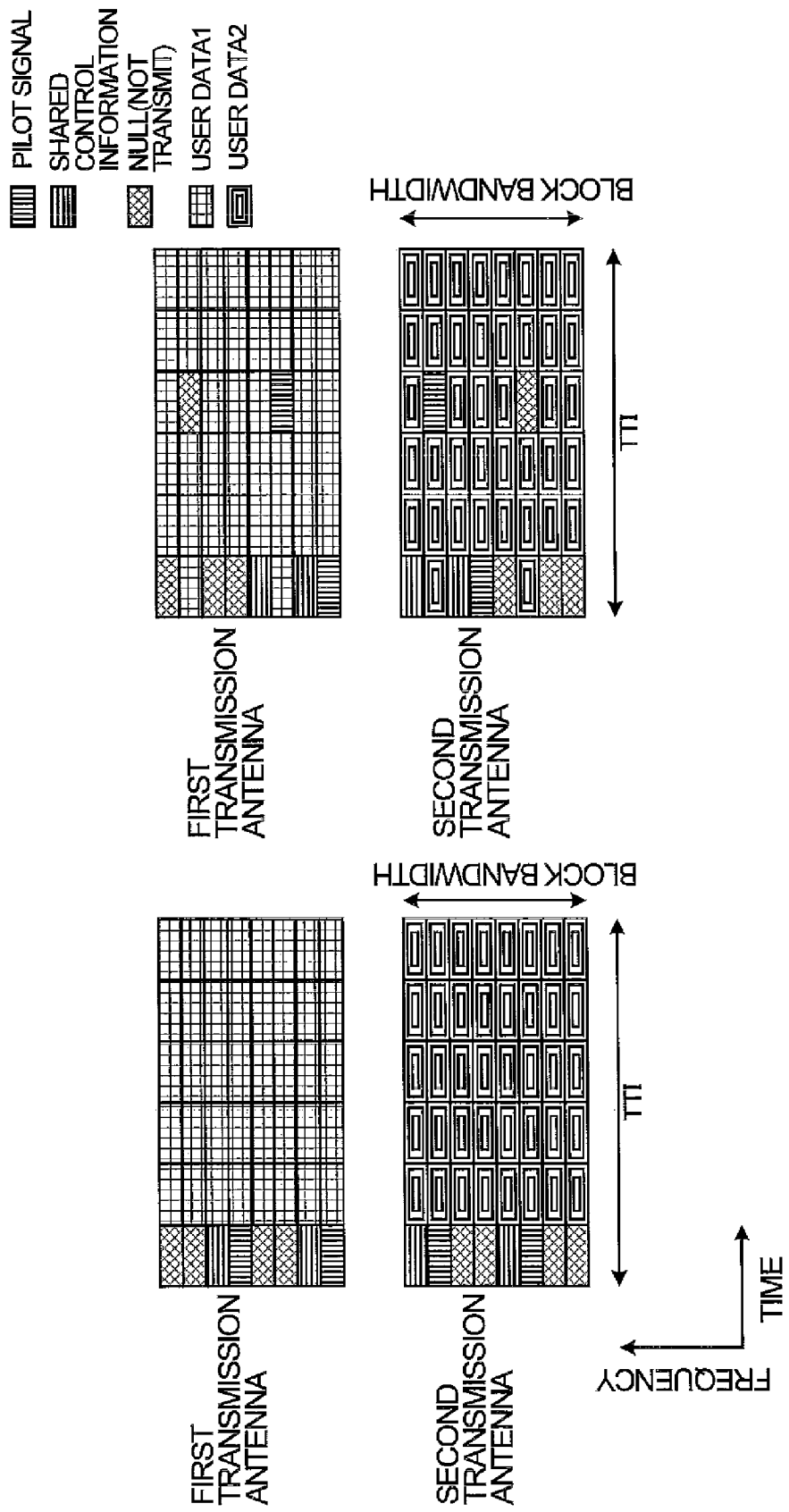
FIGS. 8A and 8B are diagrams showing block structures in the fifth embodiment.

On the aforementioned conditions with the block structure of FIG. 17A, the mapping circuits 110-1 to 110-n of the transmitter according to the fifth embodiment operate so that block configurations for each transmission antenna are as shown in FIG. 8A. Further, on the aforementioned conditions with the block structure of FIG. 17B, the mapping circuits operate so that block configurations for each transmission antenna are as shown in FIG. 8B. The operations of the mapping circuits 110-1 to 110-n will specifically be described below.

The mapping operation as shown in FIG. 8A is performed as described below.
(1) In the block structure of FIG. 17A, C(1,1), C(3,1), C(5,1) and C(7,1) are used for allocation of pilot signals. In order for the pilot signals not to overlap for each transmission antenna, pilot signals of the first transmission antenna are allocated to C1(1,1) and C1(5,1), and pilot signals of the second transmission antenna are allocated to C2(3,1) and C2(7,1). Nulls are allocated to C2(1,1), C2(5,1), C1(3,1) and C1(7,1).
(2) In the above-mentioned block structure, C(2,1), C(4,1), C(6,1) and C(8,1) are used for allocation of the shared control information. Since a pilot signal nearest C(2,1) on the low frequency side is C(1,1), the shared control information is allocated to C1(2,1) so that C(2,1) is transmitted from the first transmission antenna that transmits C(1,1), and the null is allocated to C2(2,1). Similarly, the shared control information is allocated to C2(4,1), C1(6,1) and C2(8,1), and nulls are allocated to C1(4,1), C2(6,1) and C1(8,1).
(3) User data is sequentially allocated to C1(f,t) and C2(f,t) used for allocation of the user data in the configuration of each transmission antenna.

Meanwhile, the mapping operation as shown in FIG. 8B is performed as described below.
(1) In the block structure of FIG. 17B, C(1,1), C(3,4), C(5,1) and C(7,4) are used for allocation of pilot signals. In order for the pilot signals not to overlap for each transmission antenna, pilot signals of the first transmission antenna are allocated to C1(1,1) and C1(3,4), and pilot signals of the second transmission antenna are allocated to C2(5,1) and C2(7,4) Nulls are allocated to C2(1,1), C2(3,4), C1(5,1) and C1(7,4).
(2) In the above-mentioned block structure, C(2,1) C(4,1) C(6,1) and C(8,1) are used for allocation of the shared control information. Since a pilot signal nearest C(2,1) on the low frequency side is C(1,1), the shared control information is allocated to C1(2,1) so that C(2,1) is transmitted from the first transmission antenna that transmits C(1,1), and the null is allocated to C2(2,1). Similarly, the shared control information is allocated to C1(4,1), C2(6,1) and C2(8,1), and nulls are allocated to C2(4,1), C1(6,1) and C1(8,1).
(3) User data is sequentially allocated to C1(f,t) and C2(f,t) used for allocation of the user data in the configuration of each transmission antenna.

In other words, the mapping circuits 110-1 to 110-n according to the fifth embodiment are characterized by performing the operations so that:
(1) pilot signals are arranged in each configuration not to overlap for each transmission antenna because the pilot signals for each transmission antenna are required to demodulate MIMO signals;
(2) the shared control information is arranged in a configuration of the transmission antenna of the pilot signal nearest on the low frequency side in the same sub-slot; and that
(3) the user data is arranged in the configuration of each transmission antenna as MIMO signals.

Described next is the propagation path estimating circuit 5 of the receiver according to the fifth embodiment. In the block structure as shown in FIG. 17A, the circuit 5 performs the operation as described below.
(1) Since C(1,1), C(3,1), C(5,1) and C(7,1) are pilot signals among first sub-slot C(1,1) to C(8,1) of the block transformed in the T/F transform circuit 4-1, the circuit 5 obtains a propagation path estimation value of each of the pilot signals from the difference between the phase•amplitude information of the known pilot signal and the phase•amplitude of received C(1,1), C(3,1), C(5,1) or C(7, 1).
(2) By assuming that a propagation path of a sub-channel between pilot signals in the same sub-slot is the same as the propagation path of the pilot signal on the low frequency side, propagation path estimation values are obtained on C(2,1), C(4,1), C(6,1) and C(8,1) in which the shared control information is arranged.

In the block structure as shown in FIG. 17B, the circuit 5 performs the operation as described below.
(1) Since C(1,1) and C(5,1) are pilot signals among first sub-slot C(1,1) to C(8,1) of the block transformed in the T/F transform circuit 4-1, the circuit 5 obtains a propagation path estimation value of each of the pilot signals from the difference between the phase•amplitude information of the known pilot signal and the phase•amplitude of received C(1,1) or C(5,1).
(2) As in the case of FIG. 17A, by assuming that the propagation paths of C(2,1) and C(4,1) are the same as that of C(1,1), and that the propagation paths of C(6,1) and C(8,1) are the same as that of C(5,1), the circuit 5 obtains the propagation path estimation value.

In other words, the propagation path estimating circuit 5 according to the fifth embodiment is characterized by performing the operation of:
(1) estimating the propagation path of a sub-channel from a signal of the sub-channel in which a pilot signal is arranged and the phase•amplitude information of the known pilot signal, when first sub-slot C(f,1) of the block transformed in the T/F transform circuit 4-1 is input to the propagation path estimating circuit 5; and
(2) by assuming that a propagation path of a sub-channel between pilot signals in the same sub-slot is the same as the propagation path of the sub-channel in which a pilot signal on the low frequency side is arranged, obtaining propagation path estimation values of sub-channels in which the shared control information is arranged.

Further, when the circuit 5 performs propagation path compensation of the sub-slot at the beginning of the block using the above-mentioned propagation path estimation value, and is notified that the block is a non-MIMO block from the judging circuit 10 after demodulating the shared control information, the circuit 5 may perform propagation path estimation of a user data portion by the same method as the conventional method.

As described above, by using the mapping circuits 110-1 to 110-n and the propagation path estimating circuit 5 according to the fifth embodiment, when the transmitter according to the fifth embodiment is applied to the base station, the shared control information is transmitted as a non-MIMO signal in both the non-MIMO block and the MIMO block. In addition, in the MIMO block, the shared control information is transmitted from one specific antenna selected from a plurality of transmission antennas by the mapping circuits 110-1 to 110-n.

Further, when the receiver according to the fifth embodiment is applied to the terminal, the shared control information contained in the sub-slot at the beginning of the block is demodulated as a non-MIMO signal. At this point, by using the estimation value calculated using the above-mentioned propagation path estimating circuit 5 in propagation path compensation, the terminal is capable of compensating the shared control information transmitted from the same transmission antenna as that of a pilot signal in a MIMO block using the pilot signal for each transmission antenna, while in a non-MIMO block, being capable of compensating by the same technique because the non-MIMO block is thought to be the case of one transmission antenna in a MIMO block.

Accordingly, it is possible to perform propagation path compensation without distinguishing between the non-MIMO block and MIMO block. In other words, as in the first embodiment, by performing transmission and reception with the transmitter and receiver using the mapping circuits 110-1 to 110-n and propagation path estimating circuit 5 according to the fifth embodiment, it is possible to eliminate the advance information on whether a block is transmitted in MIMO or non-MIMO notified prior to demodulation of the block, without modifying the block structure currently proposed by 3GPP. Further, it is possible to early demodulate the shared control information, and the circuit scale can be reduced because a buffer is not necessary.

(Sixth Embodiment)

Described below are the mapping circuits 110-1 to 110-n of the transmitter and the receiver according to the sixth embodiment, with reference to drawings.

Figure 9B:
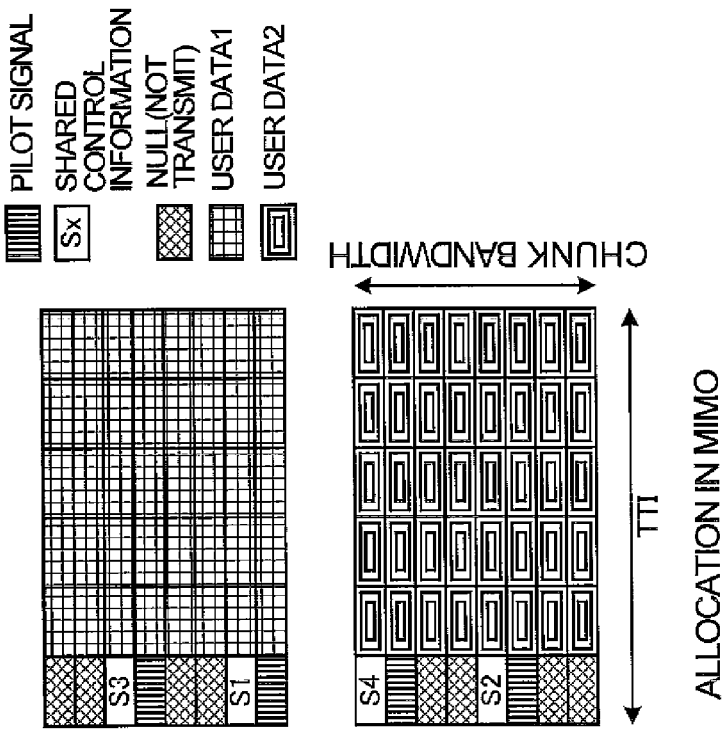
FIGS. 9A and 9B are diagrams showing block structures in the sixth embodiment.
Figure 9A:
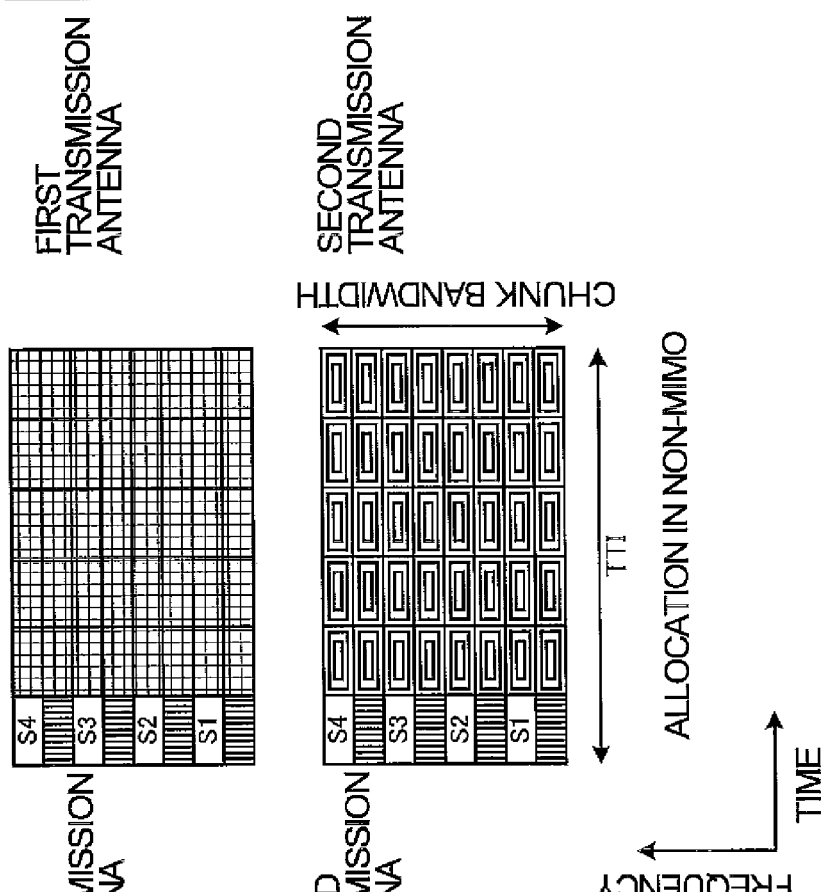

In the first embodiment as described previously, for example, the shared control information S input to the mapping circuits 110-1 in the transmitter in FIG. 1 is divided into S1 to S4, and when the allocation as shown in FIG. 9A is performed in non-MIMO, by allocating S1 to C1(2,1), S2 to C2(4,1), S3 to C1(6,1) and S4 to C2(8,1) in MIMO as shown in FIG. 9B, it is controlled that the shared control information received in the receiver has the same known allocation in the transmitter and receiver in MIMO and non-MIMO.

The operations of the mapping circuits in the sixth embodiment differ from those of the first embodiment only in division and allocation of the shared control information, and descriptions except the division and allocation of the shared control information are omitted.

Figure 10:
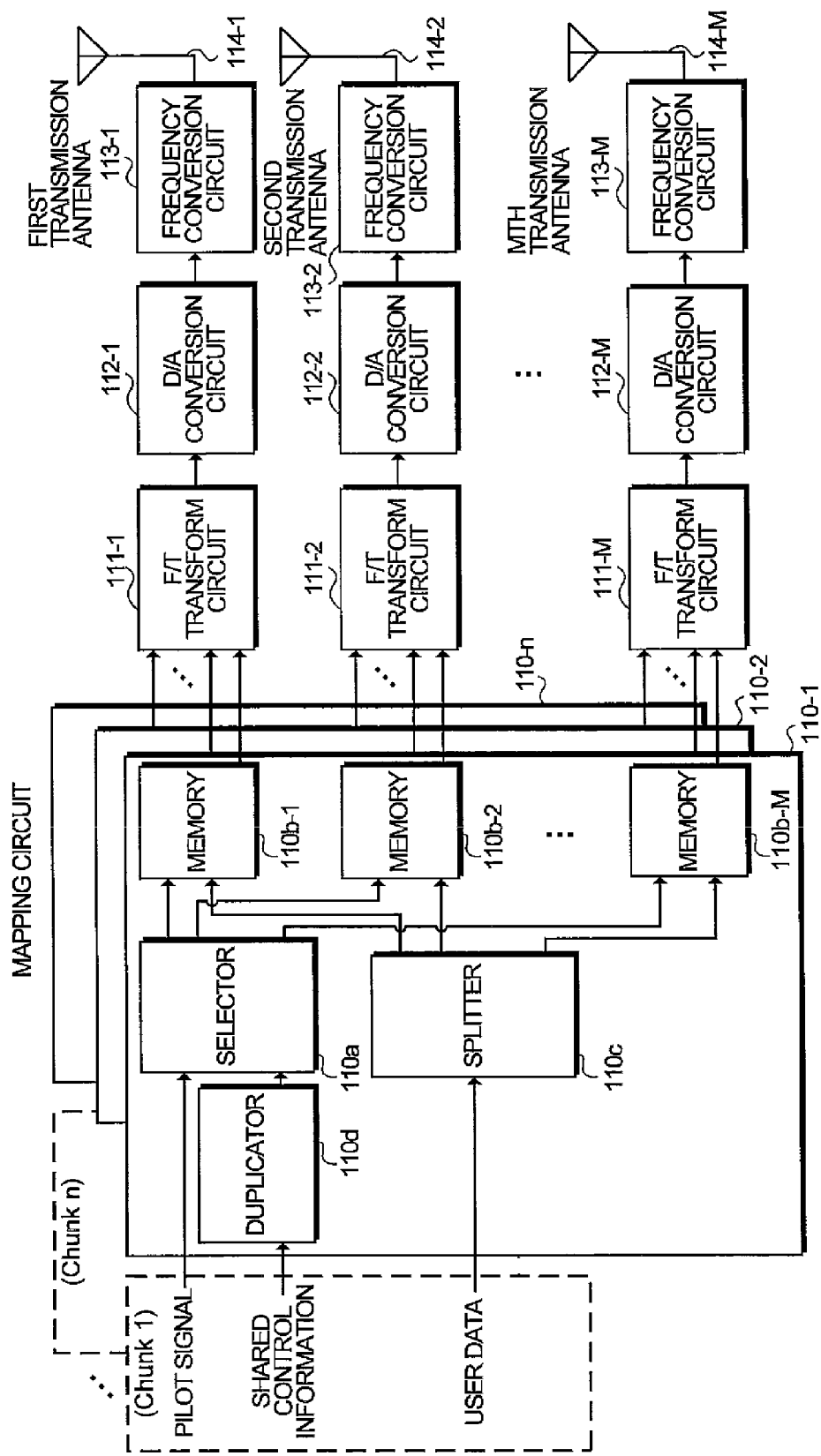
FIG. 10 is a block diagram showing a schematic configuration of a transmitter according to the sixth embodiment.

FIG. 10 is a block diagram illustrating a schematic configuration of the transmitter according to the sixth embodiment. In the mapping circuits 110-1 to 110-n of this transmitter, for the shared control information S, a duplicator 110d generates a replica S' of S. In the selector 110a, S and S' are respectively divided into S1 and S2, and S'1 and S'2. In MIMO, allocation is performed so that antennas to transmit S1 and S2 are different from antennas to transmit S'1 and S'2.

Figure 11:
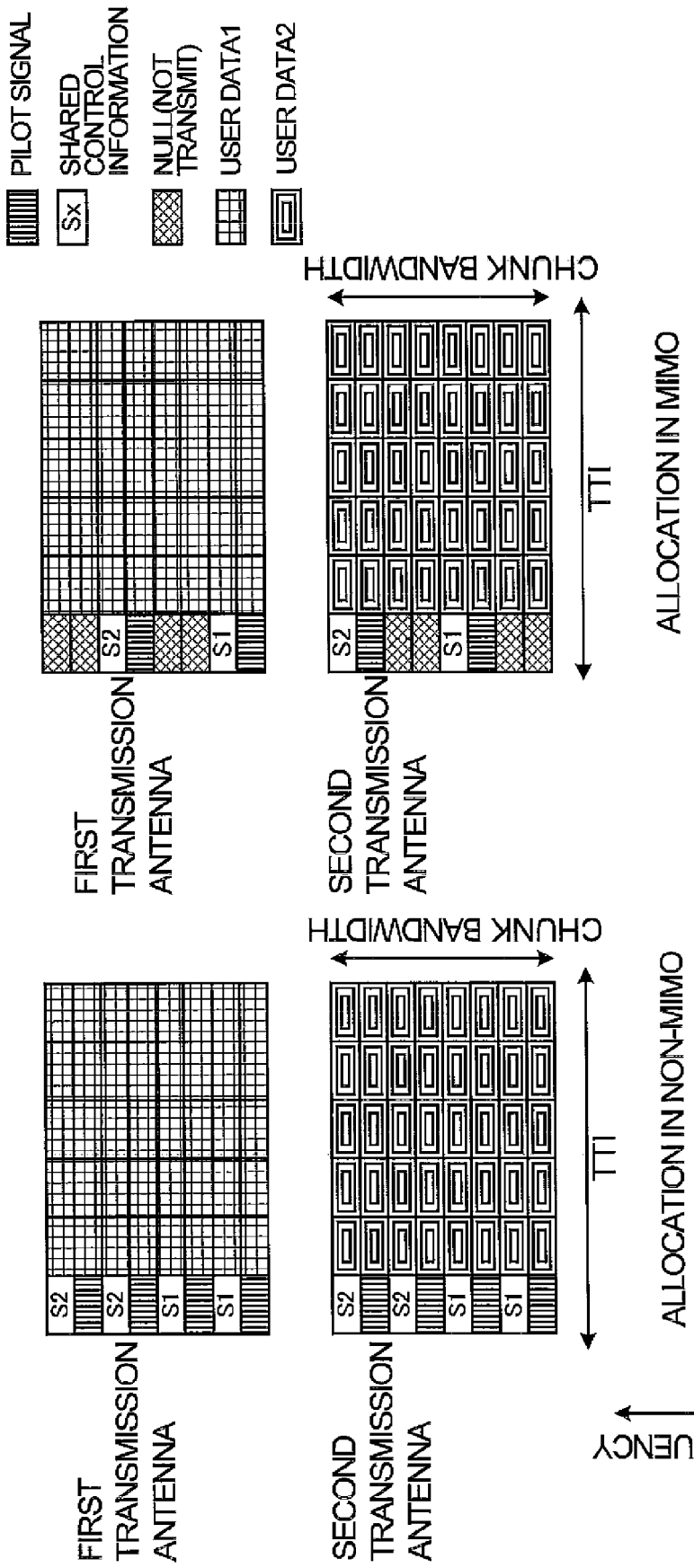
FIGS. 11A and 11B are another diagrams showing block structures in the sixth embodiment.

For example, allocation is performed as shown in FIG. 11B. In this case, in order that the shared control information received in the receiver has the same allocation, allocation is performed as shown in FIG. 11A in non-MIMO.

Next, in the receiver, by the same processing as in the first embodiment, the operation is performed up to propagation path compensation by the propagation path compensating circuit 6 of FIG. 2. The data demodulation circuit 7 combines a plurality of S1 and S2, and performs demodulation processing regarding as one piece of S1 or S2. As the combining method herein, general selection combining, equal gain combining and the like may be used.

Figure 12:
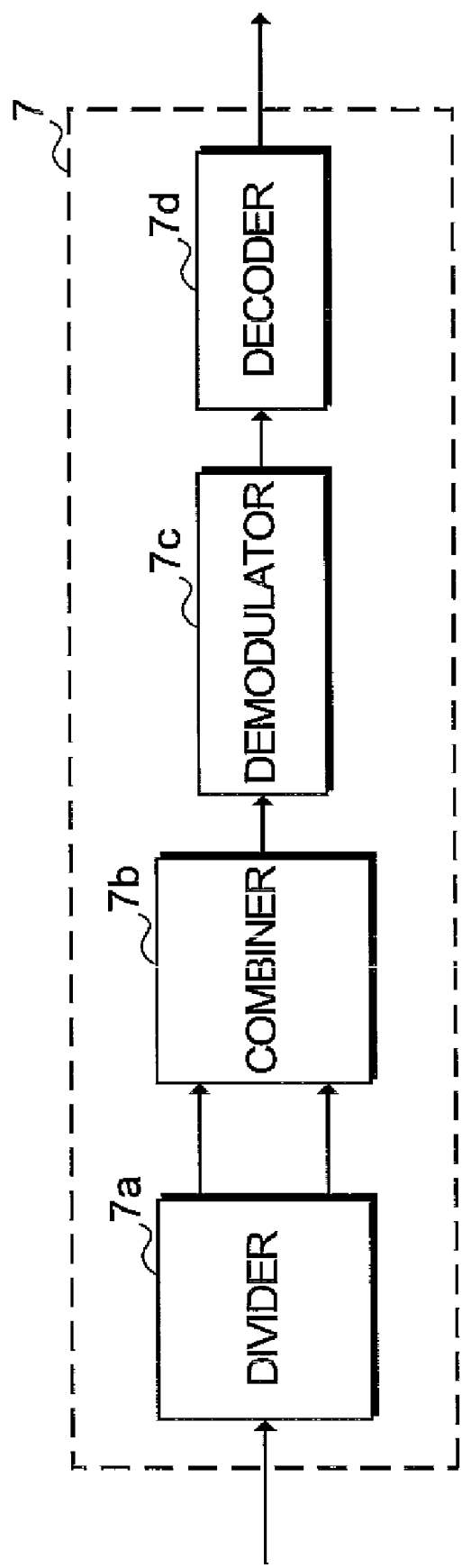
FIG. 12 is a diagram showing an example of a data demodulation circuit.

FIG. 12 is a diagram showing an example of the data demodulation circuit 7. In FIG. 12, the data demodulation circuit is comprised of a divider 7*a* that divides received signals S1, S2, S'1 and S'2 into S1 and S2, and S'1 and S'2, a combiner 7*b* that combines signals S1 and S'1, and S2 and S'2 divided in the divider 7*a* and that calculates combined values Sg1 and Sg2, a demodulator 7*c* that demodulates the combined value combined in the combiner 7*b*, and a decoder 7*d* that decodes the demodulated signal and that outputs data of the shared control information. As described above, the receiver is provided with the divider 7*a* and combiner 7*b*, and is thereby capable of performing diversity reception.

As in the foregoing, by generating replicas of the shared control information and controlling the replicas to be transmitted from different antennas in MIMO, the receiver performs combining processing, and is capable of obtaining the spatial diversity effect. Naturally, also in non-MIMO, transmitting the replicas enables the frequency diversity effect to be obtained.

Further, to enhance the frequency diversity effect in non-MIMO, it is possible to allocate signals to be apart from respective replicated signals as shown in FIGS. 13A and 13B.

(Explanation of an Antenna to Select)

In the first and fifth embodiments as described above, the processing is performed so that in a sub-block in which a single antenna transmits a pilot signal in a MIMO-block, the other antennas do not transmit pilot signals. However, by regarding pilot signals of a plurality of sub-blocks transmitted from an antenna as being one unit, and performing different coding processing on a unit basis of each antenna, it is possible to make the pilot signals for each antenna to be orthogonal to one another. This means that pilot signals in the same sub-block transmitted from a plurality of antennas can be separated as a pilot signal for each antenna in the receiving apparatus.

For example, in the case of two transmission antennas, using two sub-blocks used in transmission of pilot signals as one unit, in MIMO, (1,1) are transmitted in the two sub-blocks from the first antenna, and (1,−1) is transmitted from the second antenna. Meanwhile, the terminal obtains R1+R2 in obtaining pilot signals transmitted from the first antenna, for one unit (R1, R2) of received pilot signals, and is thereby capable of canceling pilot signals transmitted from the second antenna.

Similarly, in obtaining pilot signals transmitted from the second antenna, the terminal obtains R1-R2 and is thereby capable of canceling pilot signals transmitted from the first antenna.

In the aforementioned case, assuming changes in amplitude and phase of a pilot signal of each antenna and a pilot signal in non-MIMO in one sub-block as a complex R, by complex-multiplying the shared control information to undergo propagation path estimation using the pilot signal in the sub-block by R to transmit, the terminal is capable of performing the demodulation processing of the first and fifth embodiments.

Figure 14A:
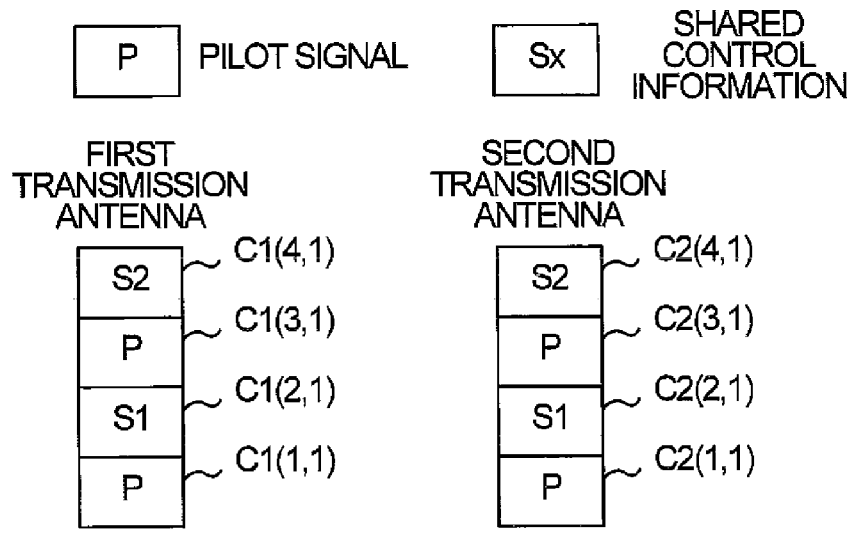
FIG. 14A is a diagram showing allocation of pilot signals P and shared control information S1 and S2 in non-MIMO.
Figure 14B:
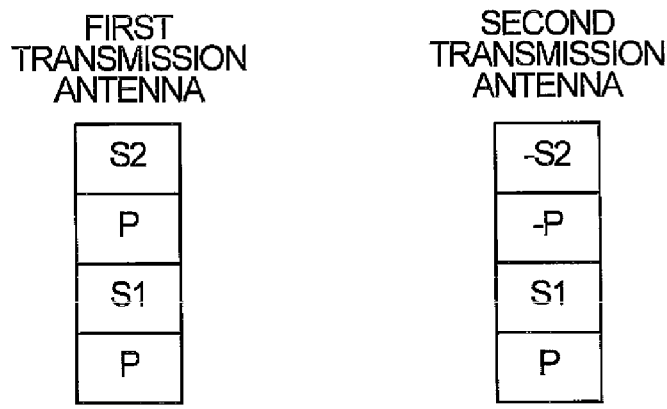
FIG. 14B is a diagram showing a state where pilot signals P and shared control information S1 and S2 are allocated to be orthogonal for each transmission antenna.
Figure 14C:
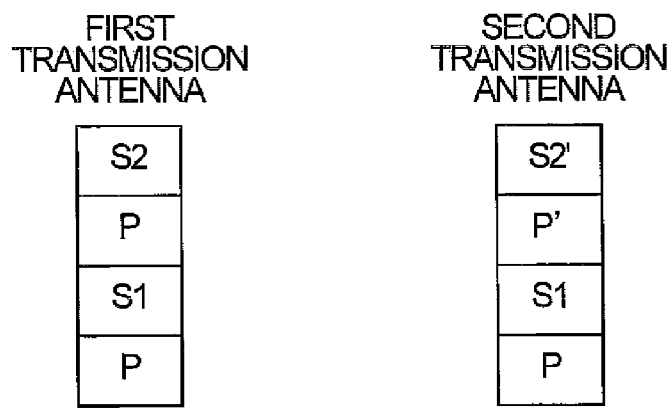
FIG. 14C is a diagram showing generalized processing in FIG. 14B.
Figure 15:
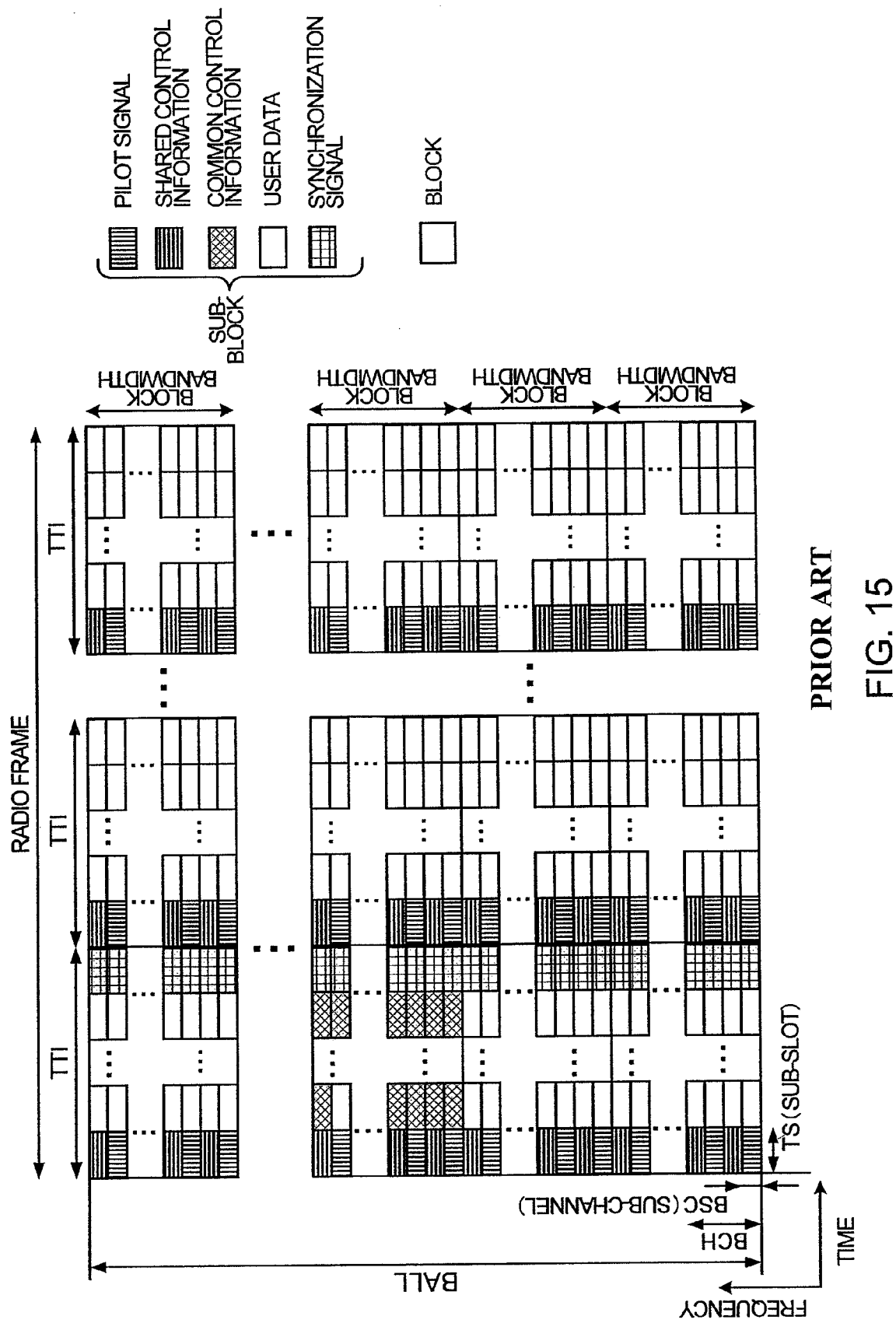
FIG. 15 is a diagram showing a configuration example of a downlink radio frame assumed based on the proposal of 3GPP in EUTRA.
Figure 16:
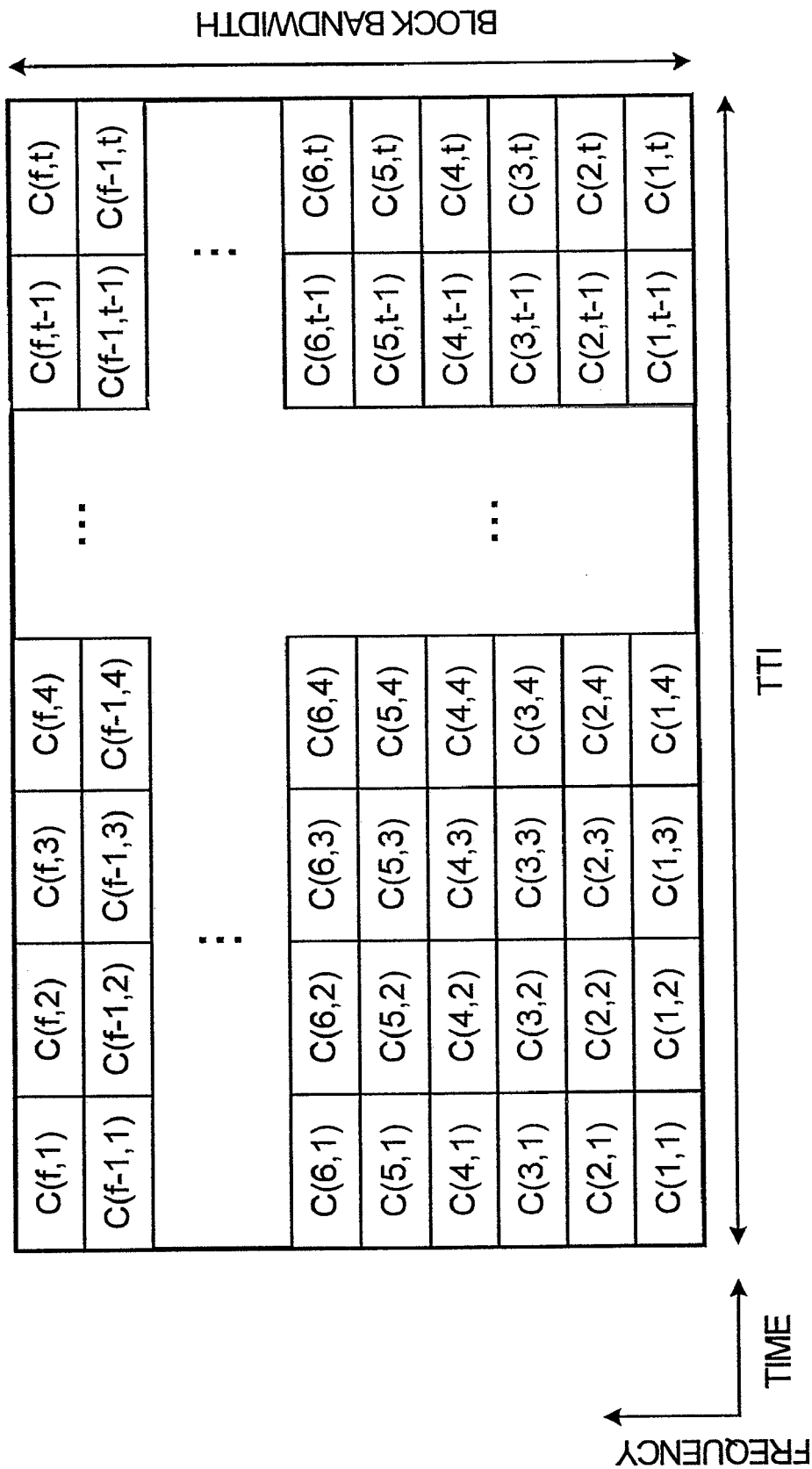
FIG. 16 is a diagram showing a configuration of sub-blocks in a block.

For example, assuming two transmission antennas, FIGS. 14A to 14C show C(1,1) to C(4,1) extracted as part of block configurations for each transmission antenna in the case that the block structure is as shown in FIG. 17A. FIG. 14A shows allocation of pilot signals P and shared control information S1 and S2 in non-MIMO. Herein, for allocation of the shared control information S1 and S2 in MIMO, each of the information S1 and S2 is assumed to be arranged in a configuration of a transmission antenna of a pilot signal nearest on the low frequency side in the same sub-block as in the fifth embodiment.

FIG. 14B shows allocation where the first antenna transmits (P,P) and the second transmission antenna transmits (P,−P) so that pilot signals are orthogonal for each transmission antenna. According to the condition as described above, the shared control information S1 in MIMO is arranged in the configuration of the transmission antenna of the pilot signal nearest on the low frequency side, and therefore, is arranged in configurations of both the first transmission antenna and second transmission antenna. At this point, there is a case that the pilot signal changes from a pilot signal in non-MIMO in phase and amplitude. Herein, a change R in phase•amplitude of C2(3,1) is −1 (R=−1).

Accordingly, for the shared control information of C2(4,1) to allocate by selecting C2(3,1) as a pilot signal nearest on the low frequency side, the processing to complex-multiply R is performed as shown below.

$$S2 \times R = -S2$$

FIG. 14C illustrates generalized processing of FIG. 14B, and assuming that a pilot signal changing in phase•amplitude from a pilot P in non-MIMO is P', and that the change in phase•amplitude is R, R can be expressed by equation (3).

[Eq. 3]

$$R = A \times e^{j\theta} \quad (3)$$

where A is a change in amplitude, θ is a change in phase, and P' can be expressed by complex-multiplication of equation (4).

[Eq. 4]

$$P' = R \times P \quad (4)$$

The shared control information S2' can be expressed by equation (5), where the information S2' is arranged in a configuration of the transmission antenna P' by selecting the pilot signal P' as a pilot signal nearest on the low frequency side.

[Eq. 5]

$$S2' = R \times S2 \quad (5)$$

Next, to demodulate the above-mentioned signal in the receiving apparatus, propagation path estimation of C(2,1) is performed from the change in phase•amplitude between the known pilot signal P and received C(1,1). Herein, with the effect of noise neglected, by passing through the propagation path R1, the signal P transmitted from the first transmission antenna is expressed by complex-multiplication of P×R1. Similarly, bypassing through the propagation path R2, the signal P transmitted from the second transmission antenna is expressed by complex-multiplication of P×R2.

The receiving apparatus receives combined two signals, P×R1+P×R2. The change in phase•amplitude from the known pilot signal P is:

$$P(R1+R2)/P = R1+R2.$$

Bypassing through the above-mentioned propagation path, the received signal of transmission signal S1 of C(2,1) is similarly:
S1(R1+R2), and by complex-dividing by the phase•amplitude change R1+R2 of the pilot signal, S1 can be obtained.

Next, for the pilot signal of C(3,1), similarly, the receiving apparatus receives:
P×R1+R×P×R2, and the change in phase•amplitude is:

$$P(R1+R\times R2)/P = R1+R\times R2.$$

The transmission signal of C(4,1) is expressed by: S2+R× S2, and by passing through the above-mentioned propagation path, this received signal is similarly: S2(R1+R×R2), and by complex-dividing by R1+R×R2 that is the change in phase•amplitude of the above-mentioned pilot signal, S2 can be obtained.

Herein, the explanation is made using the fifth embodiment as an example, but the same processing can be performed also in the first embodiment.

(For the Shared Control Information)

In the first and third to sixth embodiments as described above, the shared control information undergoes propagation path estimation and demodulation on a block basis, and also in the case of transmitting one shared control information in a plurality of blocks in the frequency direction, when the same mapping means is used in the plurality of blocks, it is possible to perform propagation path estimation and demodulation of the shared control information irrespective of MIMO or not.

The invention claimed is:

1. A wireless transmitting apparatus that has a plurality of antennas and that performs wireless transmission in Multiple Input Multiple Output (MIMO) or non-MIMO using an Orthogonal Frequency Division Multiplexing (OFDM) signal, where a block is comprised of a plurality of sub-blocks, the wireless transmitting apparatus comprising:
the plurality of antennas configured to transmit a pilot signal, shared control information, and user data; and
a mapping section that is configured to map the pilot signal, the shared control information, and the user data, on the sub-block by sub-block basis,
wherein the mapping section is configured to map the user data in a block so that the user data mapped on the sub-blocks is transmitted in either MIMO or non-MIMO,
wherein the mapping section is configured to map the shared control information included in a same block as the user data so that the shared control information mapped on the sub-blocks is transmitted in non-MIMO, and
wherein the mapping section is configured to map the shared control information and the pilot signal so that allocation of the pilot signal for performing propagation path estimation to decode the shared control information mapped on predetermined allocation of the sub-block are not changed regardless of whether user data included in the same block as said shared control information is transmitted in MIMO or non-MIMO.

2. A wireless receiving apparatus that receives the OFDM signal wirelessly transmitted from the wireless transmitting apparatus according to claim 1, the wireless receiving apparatus comprising:
a propagation path estimating section that is configured to perform propagation path estimation using a received pilot signal; and
a propagation path compensating section that is configured to compensate the shared control information and the user data for the propagation path from an estimation value calculated in the propagation path estimating section,
wherein the propagation path compensating section is further configured to use a propagation path estimation value calculated using an associated pilot signal in compensating the shared control information for the propagation path.

3. A wireless transmitting apparatus that has a plurality of antennas and that performs wireless transmission in Multiple Input Multiple Output (MIMO) or non-MIMO using an Orthogonal Frequency Division Multiplexing (OFDM) signal, where a block is comprised of a plurality of sub-blocks, with a sub-block as a minimum unit being defined by a sub-channel as a frequency component corresponding to a single or a plurality of subcarriers and a sub-slot as a time component corresponding to a single or a plurality of OFDM symbols, the wireless transmitting apparatus comprising:
the plurality of antennas configured to transmit a pilot signal, shared control information, and user data; and
a mapping section that is configured to map the pilot signal, the shared control information, and the user data, on the sub-block by sub-block basis,
wherein the mapping section is configured to map the user data in a block so that the user data mapped on the sub-blocks is transmitted in either MIMO or non-MIMO,
wherein the mapping section is configured to map the shared control information included in a same block as the user data so that the shared control information mapped on the sub-blocks is transmitted in non-MIMO regardless of whether user data included in the same block as said shared control information is transmitted in MIMO or non-MIMO, and
wherein the mapping section is configured to map the shared control information and the pilot signal so that transmitting antenna of the shared control information mapped on the sub-block is determined, in advance, between the wireless transmitting apparatus and a communicating party with transmitting antenna of the pilot signal for performing propagation path estimation.

4. The wireless transmitting apparatus according to claim 3, wherein the mapping section is configured to map in the same block as the user data transmitted in either MIMO or non-MIMO so that an antenna that transmits the shared control information is the same as the antenna that transmits the pilot signal with a frequency component nearest the shared control information in the same sub-slot.

5. The wireless transmitting apparatus according to claim 3, wherein the mapping section is configured to map in the same block as the user data transmitted in either MIMO or non-MIMO so that an antenna that transmits the shared control information is the same as the antenna that transmits the pilot signal nearest the shared control information on the low frequency side or the high frequency side in the same sub-slot.

6. The wireless transmitting apparatus according to claim 3, wherein the mapping section is configured to map in the same block as the user data transmitted in either MIMO or non-MIMO so that the antenna that transmits the shared control information is a predetermined single or plurality of antennas.

7. The wireless transmitting apparatus according to claim 6,
wherein the predetermined antenna is selected based on reception quality information of each transmission antenna acquired from a communicating party.

8. The wireless transmitting apparatus according to claim 3, wherein the mapping section is configured to map in the same block as the user data transmitted in either MIMO or non-MIMO so that the shared control information is transmitted from the plurality of antennas including the same antenna that transmit the pilot signal allocated in the sub-slot including the shared control information.

9. The wireless transmitting apparatus according to claim 3, wherein the shared control information is a control signal including at least information of a destination of the user data, and information on whether or not the block is a MIMO block.

10. The wireless transmitting apparatus according to claim 3, wherein the shared control information is comprised of a plurality of same portions, and the plurality of same portions is transmitted from respective different antennas when transmission is performed using said plurality of antennas.

11. A wireless receiving apparatus that receives the OFDM signal wirelessly transmitted from the wireless transmitting apparatus according to claim 3, the wireless receiving apparatus comprising:
a propagation path estimating section that is configured to perform propagation path estimation using a received pilot signal; and
a propagation path compensating section that is configured to compensate the shared control information and the user data for the propagation path from an estimation value calculated in the propagation path estimating section,
wherein the propagation path compensating section is further configured to use a propagation path estimation value calculated using an associated pilot signal in compensating the shared control information for the propagation path.

12. The wireless receiving apparatus according to claim 11, wherein the propagation path estimating section is further configured to use a propagation path estimation value calculated using a pilot signal received in a frequency nearest the frequency in which the shared control information is received in the same sub-slot, in compensating the shared control information for the propagation path.

13. The wireless receiving apparatus according to claim 11, wherein the propagation path estimating section is further configured to use a propagation path estimation value calculated using a pilot signal received in a frequency lower than and nearest the frequency in which the shared control information is received in the same sub-slot or in a frequency higher than and nearest the frequency in which the shared control information is received, in compensating the shared control information for the propagation path.

14. The wireless receiving apparatus according to claim 11, wherein the receiving apparatus is further configured to notify a communicating party of reception quality of a radio signal transmitted from each transmission antenna of the communicating party for each transmission antenna, and
the propagation path estimating section is further configured to use a propagation path estimation value calculated using the pilot signal transmitted from the antenna with the reception quality measurement result being good in compensating the shared control information for the propagation path.

15. A wireless transmitting method for performing wireless transmission in Multiple Input Multiple Output (MIMO) or non-MIMO using an Orthogonal Frequency Division Multiplexing (OFDM) signal, where a block is comprised of a plurality of sub-blocks, the wireless transmitting method comprising:
performing mapping of a pilot signal, shared control information, and user data, on the sub-block by sub-block basis;
performing mapping of the user data in a block so that the user data mapped on the sub-blocks is transmitted in either MIMO or non-MIMO;
wherein mapping is performed so that the shared control information included in a same block as the user data so that the shared control information mapped on the sub-blocks is transmitted in non-MIMO; and
performing mapping of the shared control information and the pilot signal so that allocation of the pilot signal for performing propagation path estimation to decode the shared control information mapped on predetermined allocation of the sub-block are not changed regardless of whether user data included in the same block as said shared control information is transmitted in MIMO or non-MIMO.

16. A wireless transmitting method for performing wireless transmission in Multiple Input Multiple Output (MIMO) or non-MIMO using an Orthogonal Frequency Division Multiplexing (OFDM) signal, where a block is comprised of a plurality of sub-blocks with a sub-block as a minimum unit being defined by a sub-channel as a frequency component corresponding to a single or a plurality of subcarriers and a sub-slot as a time component corresponding to a single or a plurality of OFDM symbols, the wireless transmitting method comprising:
performing mapping of a pilot signal, shared control information, and user data, on the sub-block by sub-block basis; and
performing mapping of the user data in a block so that the user data mapped on the sub-blocks is transmitted in either MIMO or non-MIMO,
wherein mapping is performed so that the shared control information included in a same block as the user data so that the shared control information mapped on the sub-blocks is transmitted in non-MIMO regardless of whether user data included in the same block as said shared control information is transmitted in MIMO or non-MIMO; and
performing mapping of the shared control information and the pilot signal so that transmitting antenna of the shared control information mapped on the sub-block is determined, in advance, between the wireless transmitting apparatus and a communicating party with transmitting antenna of the pilot signal for performing propagation path estimation.

17. The wireless transmitting method according to claim 16, wherein the shared control information is comprised of a plurality of same portions, and the plurality of same portions is transmitted from respective different antennas when transmission is performed using said plurality of antennas.

18. A wireless receiving method for receiving an OFDM signal transmitted by the wireless transmitting method according to claim 16, further comprising:
performing propagation path estimation using a received pilot signal; and
compensating the shared control information and the user data for the propagation path from the calculated propagation path estimation value,
wherein the propagation path estimation value is calculated using an associated pilot signal in compensating the shared control information for the propagation path.

* * * * *